(12) United States Patent
Thakur et al.

(10) Patent No.: US 11,601,463 B2
(45) Date of Patent: Mar. 7, 2023

(54) CYBERSECURITY THREAT MODELING AND ANALYSIS WITH TEXT MINER AND DATA FLOW DIAGRAM EDITOR

(71) Applicant: The Boeing Company, Chicago, IL (US)

(72) Inventors: Bhanu Pratap Singh Thakur, Bengaluru (IN); Ameya Deepak Kamat, Bengaluru (IN); Surya Sundar Raj Durairaj, Bengaluru (IN); Tim W. Anstey, Seattle, WA (US); Sangeeta Suresh Patro, Bengaluru (IN)

(73) Assignee: The Boeing Company, Arlington, VA (US)

( * ) Notice: Subject to any disclaimer, the term of this patent is extended or adjusted under 35 U.S.C. 154(b) by 49 days.

(21) Appl. No.: 17/443,633

(22) Filed: Jul. 27, 2021

(65) Prior Publication Data
US 2022/0038490 A1 Feb. 3, 2022

Related U.S. Application Data

(60) Provisional application No. 63/057,759, filed on Jul. 28, 2020.

(51) Int. Cl.
*H04L 9/40* (2022.01)
*G06N 3/088* (2023.01)

(52) U.S. Cl.
CPC ......... *H04L 63/1433* (2013.01); *G06N 3/088* (2013.01); *H04L 63/145* (2013.01);
(Continued)

(58) Field of Classification Search
CPC ............. H04L 63/1433; H04L 63/1416; H04L 63/1425; H04L 63/20
(Continued)

(56) References Cited

U.S. PATENT DOCUMENTS 10,375,093 B1 * 8/2019 Higbee ................... H04L 63/20
2006/0185014 A1 * 8/2006 Spatscheck ......... H04L 63/1416
726/23
(Continued)

OTHER PUBLICATIONS

Howard, M. et al., "The Security Development Lifecycle," Microsoft Press, 2006, 348 pages, 2006.

*Primary Examiner* — Teshome Hailu
(74) *Attorney, Agent, or Firm* — Alleman Hall Creasman & Tuttle LLP

(57) ABSTRACT

A computing system is provided implementing a text miner configured to mine unstructured data from unstructured text sources and extract features of a target computer system, and a data flow diagram editor configured to process the extracted features to identify system elements of the target computer system and interrelationships between the identified system elements, and to identify system-related candidate properties of the system elements, and to populate a system element template for each identified system element with the system-related candidate properties for that element. The data flow diagram editor is configured to generate a data flow diagram for the target computer system comprising each identified system element having the candidate properties adopted according to the system property adoption user input, and is configured to display the generated data flow diagram in the graphical user interface.

20 Claims, 13 Drawing Sheets

(52) U.S. Cl.
CPC ...... *H04L 63/1416* (2013.01); *H04L 63/1425* (2013.01); *H04L 63/20* (2013.01)

(58) Field of Classification Search
USPC .......................................................... 726/25
See application file for complete search history.

(56) References Cited

U.S. PATENT DOCUMENTS

| | | |
|---|---|---|
| 2015/0288712 A1 | 10/2015 | Jones et al. |
| 2016/0099963 A1* | 4/2016 | Mahaffey ............... G06F 21/554 |
| | | 726/25 |
| 2019/0245883 A1* | 8/2019 | Gorodissky ......... H04L 63/1433 |
| 2021/0021612 A1* | 1/2021 | Higbee ............... H04L 63/1491 |
| 2021/0136089 A1* | 5/2021 | Costea .................. G06F 21/554 |

* cited by examiner

*RUN-TIME IMPLEMENTATION OF TRAINED NEURAL NETWORKS TO PROVIDE SECURITY RECOMMENDATION*

TRAINING THE SYSTEM CLASSIFIER

*TRAINING THE THREAT CLASSIFIER*

TRAINING THE THREAT ANALYZER

SYSTEM ELEMENT TEMPLATE 60
*(PARAM. 1-n)*

Template contents:
Asset_physical_software
Asset_vulnerabilities
Threat_exposure_internal
Threat_exposure_external
Risk_tolerance
Physical_access_control :: will act as a option for remote access as well
User_identity_control
Application_identity_control
User_privileges
Remote_maintenance_privileges
Anamoly_detection_capability
Event_detection_capability
Event_reporting_cycle
Event_response_planned
Event_response_active
Event_response_asset_isolation_activation_frequency
Post_event_analysis_implemented
Post_event_analysis_reported
Post_incident_improvements_implemented
SME_Categorization
User_Categorization
Model_Category

FIG. 6

THREAT TEMPLATE 72
*(PARAM. 1-n)*

Template contents:
Actors
Intent
Capability
Tactics
Techniques
Procedures
Motivations
Access_to_the_intended_targets
SME_Categorization
User_Categorization
Model_Category
Mitigation_approach

FIG. 7

CYBERSECURITY THREAT MODELING AND ANALYSIS WITH TEXT MINER AND DATA FLOW DIAGRAM EDITOR

CROSS REFERENCE TO RELATED APPLICATIONS

This application claims priority to U.S. Patent Application Ser. No. 63/057,759, filed Jul. 28, 2020, the entirety of which is hereby incorporated herein by reference for all purposes.

FIELD

The present disclosure relates generally to cybersecurity and, in particular, to modeling and analysis of cybersecurity threats using one or more artificial intelligence models.

BACKGROUND

Cyber-attacks and data breaches are commonplace, increasing in volume, and becoming costlier by the year. Despite improvements in security technology and security practices to thwart most attacks, targeted security breaches have not declined. To help understand and reduce cybersecurity risks, threat modeling software has been developed. However, several challenges exist with the practical deployment and usage of current threat modeling software. For example, with increasing computer system complexity, the process of modeling data flows between computer system elements and associated security risks can be time consuming, prone to error, and expensive. As a result, emerging threats or newly provisioned equipment and software in a complex computer system might not be recognized until a breach has already occurred. Many of the notorious security breaches of recent times have only been discovered long after they occurred. Opportunities exist to address these and other challenges, to improve cybersecurity risk assessment.

SUMMARY

In view of the above, according to a first aspect, a cybersecurity computing system is provided, including a processor and a memory storing executable instructions that in response to execution by the processor cause the computing system to implement at least: a system classifier comprising a first artificial intelligence model configured to classify each of a plurality of elements of a target computer system into one or more defined security categories of a security categorization model; a threat classifier comprising a second artificial intelligence model configured to classify each of a plurality of identified cybersecurity threats into the one or more defined security categories; and a threat analyzer configured to: perform an analysis of a risk posed by each cybersecurity threat of the plurality of identified cybersecurity threats to each element of the plurality of elements of the target computer system based at least on the one or more defined security categories of the classified cybersecurity threats and the one or more defined security categories of the classified elements of the target computer system, and output a security recommendation based on the analysis.

According to a second aspect, a cybersecurity computing system is provided, including a processor and a memory storing executable instructions that, in response to execution by the processor, cause the processor to implement at least: an artificial intelligence model comprising: a text miner configured to mine unstructured data from unstructured text sources and extract one or more features of a target computer system, and a data flow diagram editor configured to process the one or more extracted features to identify system elements of the target computer system and interrelationships between the identified system elements, to identify system-related candidate properties of the system elements, and to populate a system element template for each identified system element with the system-related candidate properties for that element; and a graphical user interface to be displayed on a display device, the graphical user interface being configured to display the system-related candidate properties for each system element in a data flow diagram region, and configured to receive a system property adoption user input for each system-related candidate property of each identified system element. The data flow diagram editor is configured to generate a data flow diagram for the target computer system comprising each identified system element having the system-related candidate properties adopted according to the system property adoption user input, and is configured to display the generated data flow diagram in the graphical user interface via the display device.

The features, functions, and advantages that have been discussed can be achieved independently in various embodiments or can be combined in yet other embodiments further details of which can be seen with reference to the following description and drawings.

BRIEF DESCRIPTION OF THE DRAWINGS

FIG. 6 is a schematic diagram illustrating an example system categorization template of the security computing system of FIG. 1.

FIG. 7 is a schematic diagram illustrating an example threat categorization template according the security computing system of FIG. 1.

DETAILED DESCRIPTION

Figure 1:
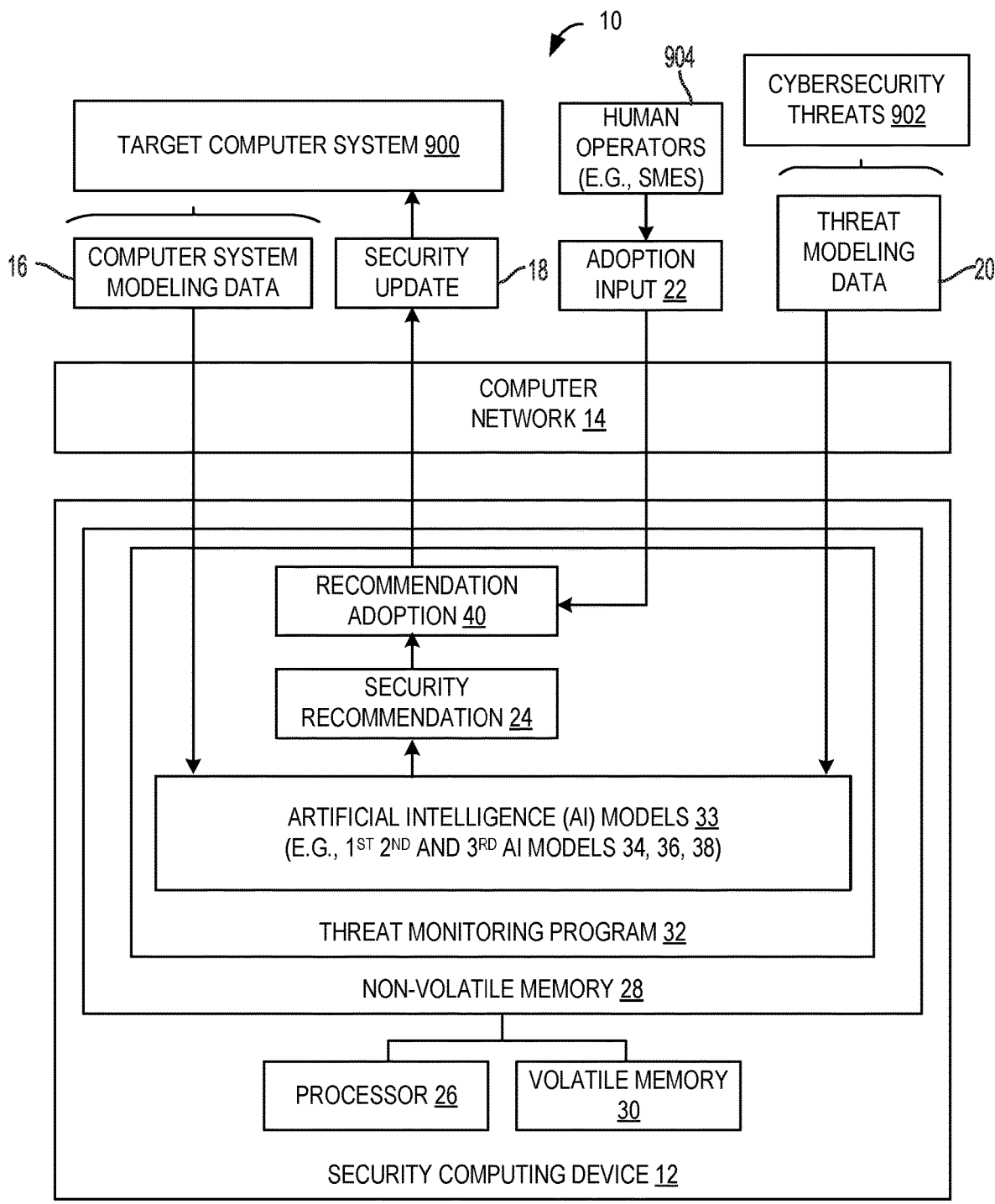
FIG. 1 is a general schematic diagram illustrating an overview of a security computing system for evaluating cybersecurity risks, according to an embodiment of the subject disclosure.

In view of the above issues, as shown in FIG. 1, a security computing system 10 is provided to assess security of a target computer system 900 using artificial intelligence models 33, to thereby identify applicable cybersecurity threats 902 and generate security recommendations 24. Security computing system 10 includes a security computing device 12 configured to communicate via a computer network 14 with one or more data sources that contain data regarding a target computer system 900 and cybersecurity threats 902.

The security computing device 12 includes a processor 26, non-volatile memory 28, and volatile memory 30. A threat monitoring program 32 stored in non-volatile memory 28 can be executed by the processor 26 using portions of volatile memory 30. The threat monitoring program 32 of the security computing device 12 receives computer system modeling data 16 from data sources related to the target computer system 900 via the secure network 14 and models the target computer system with the aid of the artificial intelligence models 33. The threat monitoring program 32 also receives threat modeling data 20 from data sources related to cybersecurity threats 902. The artificial intelligence models 33 are executed by the threat monitoring program 32 to generate a security recommendation for a human operator 904 of the system to review based upon the computer system modeling data 16 and thread modeling data 20. The artificial intelligence model 33 can include first artificial intelligence model 34, second artificial intelligence model 36, and third artificial intelligence model 38, with specific functions as described below in reference to subsequent figures.

Following generation of the security recommendation 24, the threat monitoring program 32 is configured to receive adoption input data 22 from the human operator 904 indicating whether a particular security recommendation 24 is to be adopted. If the adoption input data 22 provides a recommendation adoption 40 for the security recommendation 24, then in response a security update 18 is outputted via the secure network 14 based on the recommendation adoption 40 of the security recommendation 24. On the other hand, if the adoption input data 22 declines to provide a recommendation adoption 40 (i.e., includes a recommendation rejection), then in response a security update 18 is not sent to the target computer system 900.

Figure 2A:
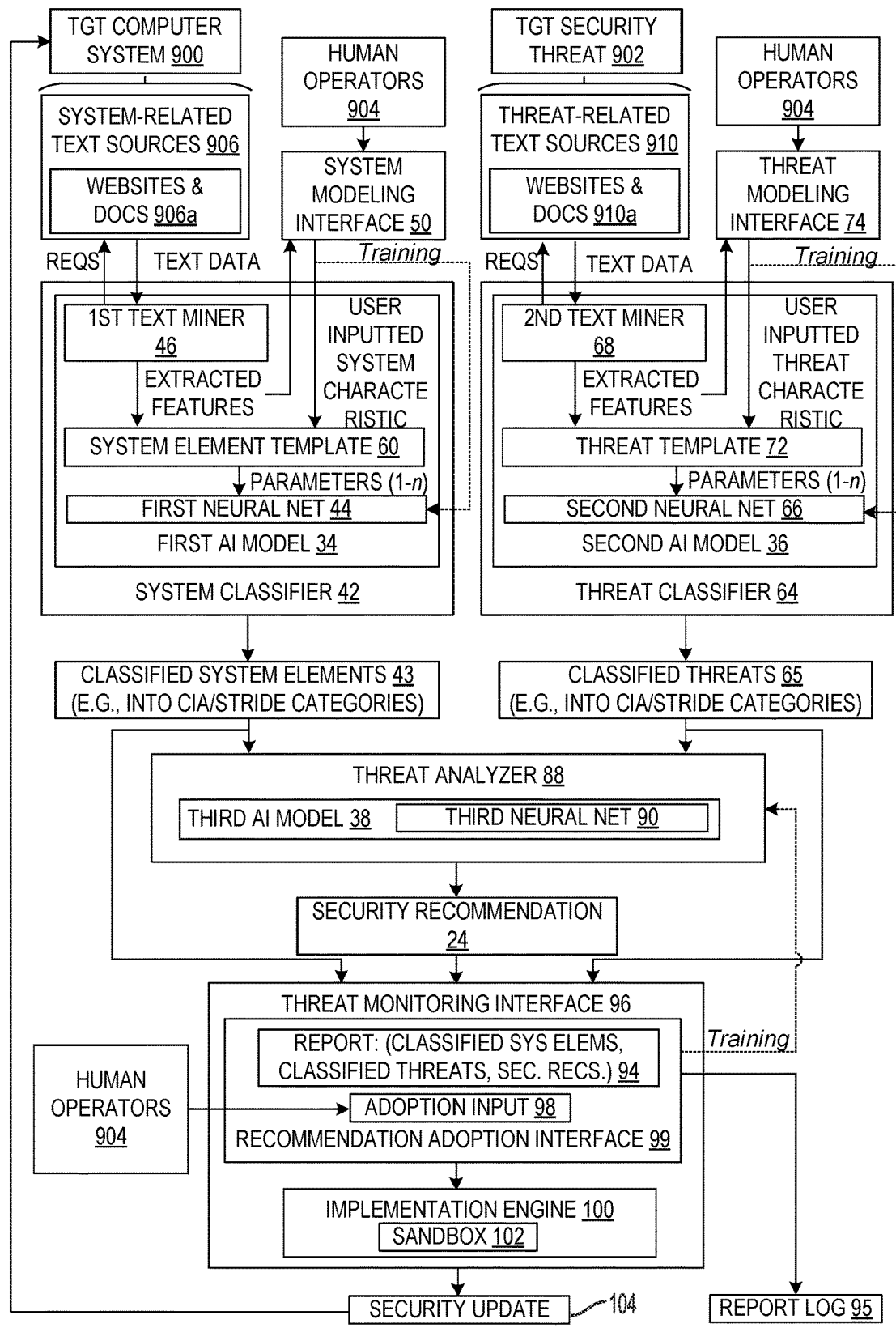
FIG. 2A is a detailed schematic diagram illustrating the software elements executed on one or more security computing devices of the security computing system of FIG. 1, with data flows showing run-time implementation of trained neural networks to provide security recommendations according to an embodiment of the subject disclosure.

FIG. 2A illustrates a run-time implementation using trained neural networks as the artificial intelligence models 33 of security computer system 10, to provide security recommendations 24. As shown, security computer system 10 includes a system classifier 42 that includes a first artificial intelligence model 34 configured to classify each of a plurality of elements of a target computer system 900 into one or more defined security categories of a security categorization model to output classified system elements 43. The first artificial intelligence model 34 includes a first neural network 44 that has been trained on a first training data set that includes system element template 60 data and user inputted system categories or characteristics of the computer system, and is configured to, at run-time, for each of a plurality of elements of a target computer system 900, receive as run-time input data a run-time system categorization template 60 and in response classify each system element into one or more defined security categories to thereby output classified system elements 43.

The first artificial intelligence model 34 includes a first text miner 46 configured to mine unstructured data from unstructured text sources from one or more system-related text sources 906, and extract features of target computer system 900. The first text miner 46 can include one or more recurrent neural networks configured to perform textual analysis including at least one of the group consisting of: text classification, text clustering, concept/entity extraction, production of granular taxonomies, sentiment analysis, document summarization, and entity relation modeling. The system-related text data sources 906 can include public and/or private web pages and/or documents 906a, and the documents can include data flow diagrams of system elements, system security policies, and/or system design requirements. The results of the text mining can be outputted as an extracted feature set into a system element template 60.

The system classifier 42 applies a threat taxonomy such as CIA (Confidentiality, Integrity, Availability) or STRIDE (Spoofing, Tampering, Repudiation, Information Disclosure, Denial of Service, Elevation of Privilege), to each of the system elements in the list by mapping the CIA categories or STRIDE categories to the system element types to identify a threat type for each target computer system element. In other words, each component of the target computer system 900 is analyzed for susceptibility to the threats.

STRIDE categories divide cybersecurity threats into six categories: spoofing threats, in which an attacker poses as something or someone else; tampering threats, which involve malicious modification of data or code; repudiation threats, which are made by denying to have performed an action that other parties can neither confirm nor contradict; information disclosure threats, which involve the exposure of information to individuals who are not supposed to have access to it; denial of service attacks, which deny or degrade service to valid users; and elevation of privilege threats, which occur when a user gains increased capability.

It will be appreciated that a system element can be mapped to more than one STRIDE category. For example, an external entity can be mapped to Spoofing and Repudiation. A data flow can be mapped to Tampering, Information Disclosure, and Denial of Service. A data store can be mapped to Tampering, and Information Disclosure. A process can be mapped to all six STRIDE categories.

The first text miner 46 can also send the extracted features of the computer system 900 to a system modeling interface 50, which processes the extracted features, identifies the system elements associated with the extracted features, populates a system element template for each identified system element, and sends the system elements and information about each system element to the system classifier 42, as described in more detail with reference to FIGS. 2B and 2C.

Figure 2B:
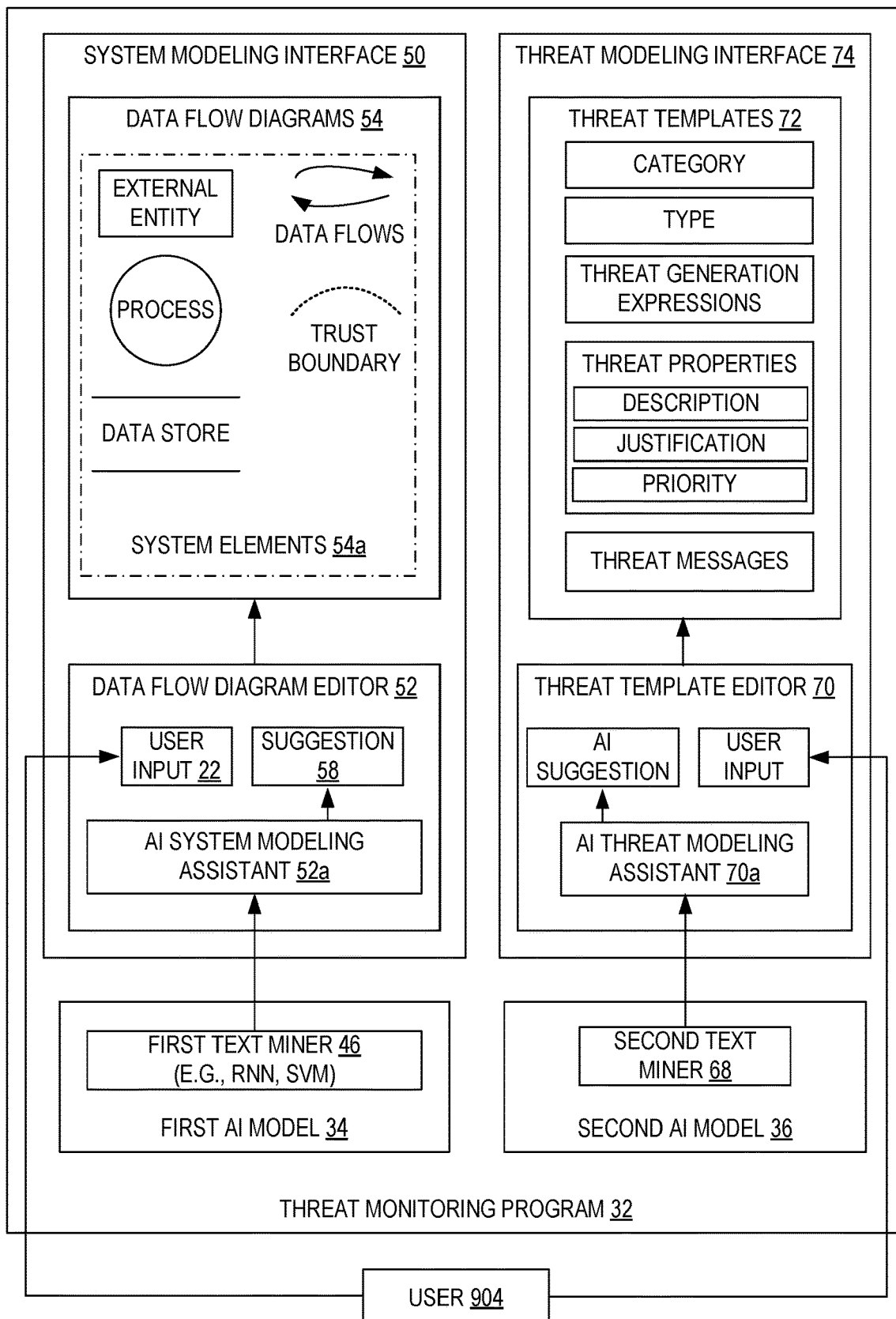
FIG. 2B is a detailed schematic diagram illustrating the artificial intelligence models, editors, and modeling interfaces of the threat monitoring program according to an embodiment of the subject disclosure.

Referring briefly to FIG. 2B, the system modeling interface 50 of the threat monitoring program 32 comprises a data flow diagram editor 52 configured to generate data flow diagrams 54 containing system elements 54a. The first text miner 46 of the first artificial intelligence model 34 sends the extracted features of the target computer system 900 to the data flow diagram editor 52 of the system modeling interface 50. An artificial intelligence system modeling assistant 52a of the data flow diagram editor 52 processes the extracted features to identify the system elements 54a of the target computer system 900 and the interrelationships between the identified system elements 54a, and to populate a system element template for each identified system element 54a with the system-related candidate properties for that element.

Figure 2C:
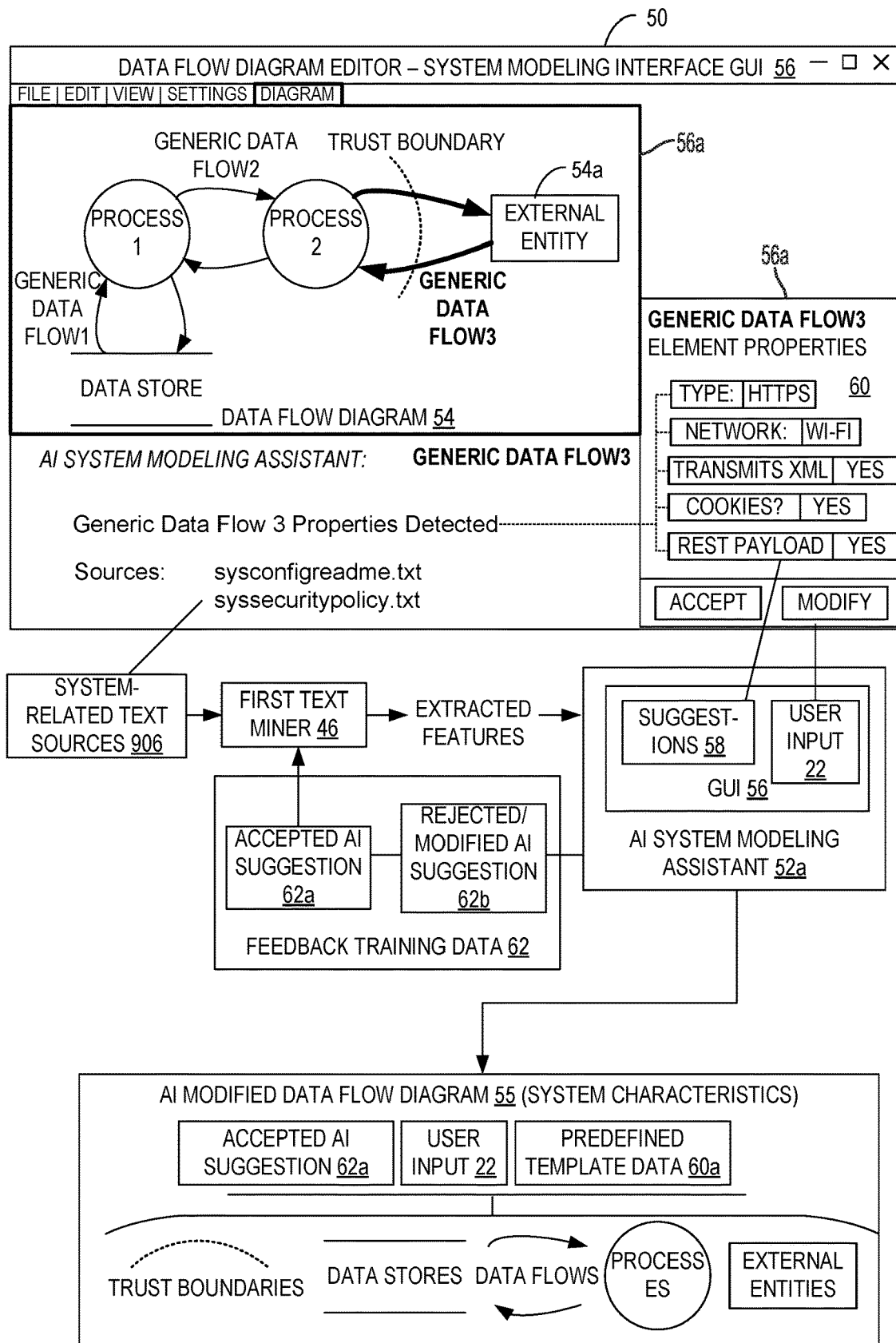
FIG. 2C is a detailed schematic diagram illustrating the graphical user interface of the system modeling interface and a flow diagram showing the process of feedback training the first artificial intelligence model and generating a data flow diagram with system elements according to an embodiment of the subject disclosure.

Referring now to FIG. 2C, a graphical user interface 56 of the data flow diagram editor 52 is displayed on an associated display device and configured to display the system-related candidate properties for each system element 54a in a data flow diagram region 56a as suggestions 58. The user can accept, reject, or modify the candidate properties for each system element 54a, and can add, delete, or modify the system elements 54a themselves and the interrelationships between system elements 54a. The graphical user interface 56 of the data flow diagram editor 52 is configured to receive a system property adoption user input 22 for each system-related property of each identified system element 54a.

Once system elements 54a and their constituent properties meet with the user's approval, the user can instruct the data flow diagram editor 52 to generate a data flow diagram 54 accordingly. Responsive to the user's approval, the data flow diagram editor 52 is configured to generate a data flow diagram 54 for the target computer system 900 containing each identified system element 54a having the candidate properties adopted according to the system property adoption user input 22. The data flow diagram editor 52 is configured to display the generated data flow diagram 54 in the graphical user interface 56 on the display device.

The graphical user interface 56 provides a collection of shapes for respective types of components (e.g., host, process, data store, external entity) and data flows of a computer system, and various relevant components of the complex-system platform configured to implement the computer system. And in some examples, these shapes can be configured to accept shape data, which can be specifically configured for types of attributes of the computer systems' components (e.g., host, process, data store, external entity) and data flows. The graphical user interface 56 can be provided by a commercially-available diagramming application program, specifically configured to carry out various operations of example implementations; and in some examples, the report can be output to and displayed by a commercially-available spreadsheet application program.

In this manner, the artificial intelligence system modeling assistant 52a can prepopulate a system model with candidate system elements and properties of said system elements 54a, and the human operator 904 can modify these candidate system elements 54a and properties as needed until satisfaction. The data flow diagram editor 52 can accept user input 22 as system elements 54a are identified and system element templates 60 are populated, so that the human operator 904 can provide feedback to improve the accuracy of the identification of system elements 54a and the populating of the system element templates 60. An example of a system element template 60 is shown in FIG. 6.

Further referring to FIG. 2C, in this example of a practical application of the system modeling interface 50, the first text miner 46 mines unstructured data from unstructured text sources 906 including system configuration files and security policies, extracts features of the target computer system 900 from these text sources 906, and feeds extracted features of the target computer system 900 into the artificial intelligence system modeling assistant 52a, which subsequently identifies system elements 54a and interrelationships between the identified system elements 54a that the system modeling assistant 52a maps in a data flow diagram 54, identifies system-related candidate properties of the system elements 54a, and populates the system element templates 60 for each identified system element with system-related candidate properties for that element. System elements 54a can include processes, external entities, data stores, data flows, privilege boundaries, and/or trust boundaries. The system elements 54a can be structured in form of layers such as connected device security layer, network security layer, frontend security layer, database backend security layer, and hosting infrastructure security layer. Further system elements 54a can be added based on policy and security requirements.

For example, external dependencies can also be added as system elements 54a. The operating systems that the application runs on, the database that the application uses, web servers that the application uses, high-level application frameworks that the application uses are examples of external dependencies. Processes can include web applications, user profiles, memberships, order processors, synchronous order processors, asynchronous order processors, data access components, queuing components, and auditing engines, for example. External entities can include customers, anonymous users, and administrators, for example. Data stores can include web application configuration data, web pages, user profile data, membership data, orders data, inventory data, asynchronous orders data, and audit-log data, for example. Data flows can include user requests, user responses, customer requests, customer responses, web application reading configuration data, web pages read by web application, administrators creating or updating web application configuration data, administrators reading web application configuration, administrators creating, updating, or deleting web pages, and administrators reading web pages, for example.

Referring to FIG. 6, it will be appreciated that the system element templates 60 provide a structure within which the extracted features from the unstructured data can be inserted, to thereby convert the unstructured data regarding the system 900 into structured data representing the system 900. The structured information stored within the system element templates 60 of each identified system element 54a includes attributes of the components and data flows, and the attributes can be organized as metadata according to some metadata schema and associated with the system elements 54a. In some examples, this structured information can include hardware, software, and communications attributes of at least some of the components and data flows. And in some examples, the structured information can include any authentication, authorization, or security controls to which the components and data flows are subject.

Such authentication, authorization, and security controls can include physical access controls, user identity controls, application identity controls, user privileges, remote maintenance privileges, and remote maintenance privileges, for example. Other hardware, software, and communication attributes can include physical software assets, asset vulnerabilities, internal threat exposures, external threat exposures, risk tolerances, anomaly detection capabilities, event detection capabilities, event reporting cycles, and planned event response, for example. The metadata can indicate whether the system element 54a contains cookies, whether the system element 54a transmits XML, in which physical network the system element 54a is located, etc.

In this manner, external security information can also be included in the system elements 54a as metadata. For example, external security information can include the fact that administrators can change any setting in the system 900, including the Web service. In this way, metadata can be used to complement the granular layers with policy and security requirements of the system 900 that is being analyzed.

Referring to FIG. 2C, for each system element 54a, the system modeling assistant 52a provides a graphical user interface 56 to present metadata for each system element 54a as suggestions 58, and allow for a user such as human operator 904 to provide system property adoption user input 22 including an indication of whether to accept or reject each of the system-related candidate properties. The system property adoption user input 22 can further include a modification to at least one system-related candidate property and an acceptance of the modification. In this example, the user such as human operator 904 can provide input 22 to modify configurable attributes including the physical network in which the system element 54a is located, and indicate that the system element 54a contains cookies. The modifications 62b or acceptances 62a of the suggestions 58 are incorporated as feedback training data 62 which is used to train the one or more neural networks of the first text miner 46 of the first artificial intelligence model 34 using feedback training based upon the system property adoption user input 22.

The system modeling assistant 52a subsequently outputs a modified data flow diagram 55 with system elements 54a generated based on user input 22, system element template data 60a, and the extracted features from the first text miner 46 of the first artificial intelligence model 34. This modified data flow diagram 55 can include a list of system elements 54a that are fitted into a predetermined or programmatically built template 60, which labels each system element 54a as processes, external entities, data stores, data flows, privilege boundaries, trust boundaries, metadata, and so forth.

Referring back to FIG. 2A, the threat classifier 64 includes a second artificial intelligence model 36 configured to classify each of a plurality of identified cybersecurity threats 902 into the one or more defined security categories. The second artificial intelligence model 36 includes a second neural network 66 that has been trained on a second training data set that includes threat template data and user inputted threat categories of the cybersecurity threat, and is configured to, at run-time, for each of a plurality of elements of a target cybersecurity threat 902, receive as run-time input run-time threat template data and in response classify the target cybersecurity threat 902 into the one or more defined security categories.

Referring to FIGS. 2A and 2B, the second artificial intelligence model 36 includes a second text miner 68 configured to mine unstructured data from second unstructured text sources including one or more threat-related text sources 910, and extract features of at least one cybersecurity threat 902. A threat template editor 70 is configured to process the extracted features, identify cybersecurity threats 902 associated with the extracted features and their interrelationships with system elements 54a, and populate a threat template 72 for each identified cybersecurity threat 902 with threat-specific candidate properties for that threat 902. The second text miner 68 can include one or more recurrent neural networks 66 configured to perform textual analysis including at least one of the group consisting of: text classification, text clustering, concept/entity extraction, production of granular taxonomies, sentiment analysis, document summarization, and entity relation modeling. The second text miner 68 then outputs the results of the text mining as an extracted feature set into the threat template 72.

Referring to FIG. 7, the threat template 72 can include associated contexts including actors, intents, capabilities, tactics, techniques, procedures, and motivations. In this way, a list of known cybersecurity threats 902 is compiled. The threat template can be applied to the list of cybersecurity threats, so that each threat is labeled with a threat context, which can include actors, intents, capabilities, tactics, techniques, procedures, and motivations.

Referring back to FIGS. 2A and 2B, the second text miner 68 mines, crawls, and/or scrapes various documents and IT security policy documents 910a from the internet or intranet for known cybersecurity threats, including the latest cybersecurity attacks such as artificial intelligence based attacks and man in middle attack, and others. This information will be used to train the security computing device 12 to ready the security computing system 10 against future cyberattacks. The mined documents 910a can include documents and websites that are internal and external to the security system. Documents 910a can be mined from known repositories of cybersecurity information, such as cybersecurity databases, vulnerability databases, and cybersecurity reports from various cybersecurity firms. This information will be used to train the security computing device 12, making the security computing system 10 ready against future cyberattacks.

The threat classifier 64 also receives lists of threats from the crowd sourcing threat modeling interfaces 74 and uses lexical, sentimental, and syntactical analysis to extract key words from the mined documents 910a to identify known cybersecurity threats 902 and their associated contexts, and output classified threats 65 to the threat analyzer 88. Thus, a plurality of subject matter experts among human operators 904 submits lists of known cybersecurity threats 902 via threat modeling interfaces 74 which are executed on user computing devices that are used by the subject matter experts. These threat modeling interfaces 74 crowd-source the mining of names of cybersecurity threats 902 so that subject matter experts can provide their input to the security computing system 10.

Referring again to FIG. 2B, the threat modeling interface 74 of the threat monitoring program 32 comprises a threat template editor 70 configured to populate threat templates 72. The threat templates 72 can be predetermined or programmatically built to describe the characteristics of each cybersecurity threat 902, including source and target authentications, source and target processes, trust line boundaries that are crossed, source and target data stores, source and target servers, source and target applications, affected data flows, affected external entities, and others. The second text miner 68 of the second artificial intelligence model 36 mines unstructured threat-related text sources 910, extracts features of at least one cybersecurity threat 902, and outputs the extracted features of the at least one cybersecurity threat 902 to the threat template editor 70 of the threat modeling interface 74. The artificial intelligence threat modeling assistant 70a of the threat template editor 70 processes the extracted features, identifies the cybersecurity threats 902 associated with the extracted features and their interrelationships with system elements 54a, populates a threat template 72 for each identified cybersecurity threat 902 with threat-specific candidate properties for that threat 902.

Figure 2D:
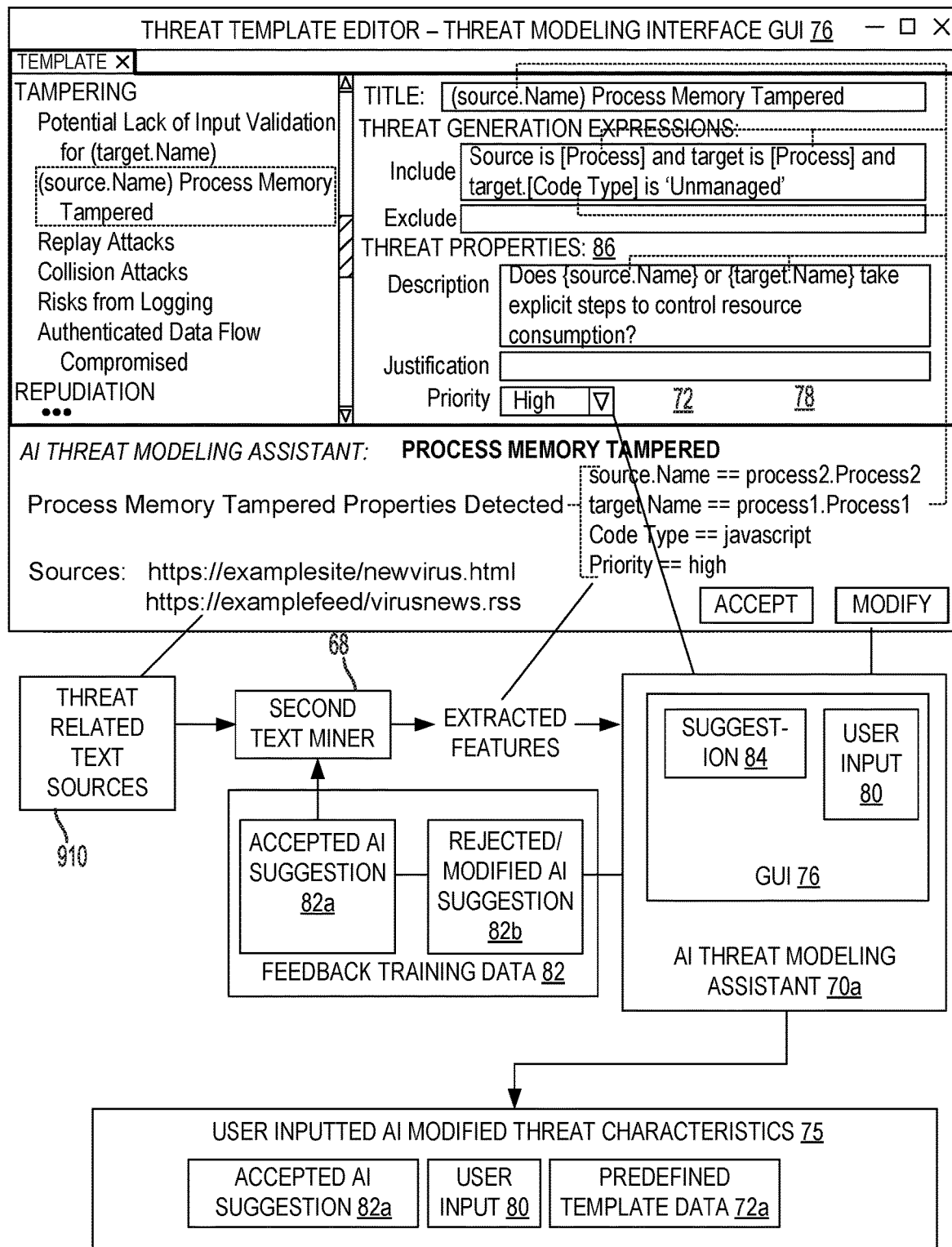
FIG. 2D is a detailed schematic diagram illustrating a graphical user interface of the threat modeling interface and flow diagram showing the process of feedback training the second artificial intelligence model and generating a set of threat characteristics according to an embodiment of the subject disclosure.

Referring to FIG. 2D, a graphical user interface 76 of the threat template editor 70 is further configured to display the threat-specific candidate properties 86 in a threat template editor region 78, and receive a threat property adoption user input 80 for each of the threat-specific candidate properties 86 for each identified cybersecurity threat 902. The user, i.e., human operator 904, can accept, reject, or modify the candidate properties 86 for each cybersecurity threat 902, and can add, delete, or modify the cybersecurity threats 902 themselves and their interrelationships with system elements 54a, so that the user can provide feedback to improve the accuracy of the identification of cybersecurity threats 902 and the populating of the threat templates 72. The threat property adoption user input 80 includes an indication of whether to accept or reject each of the threat-specific candidate properties 86. The threat property adoption user input 80 can further include a modification to at least one of the threat-specific candidate properties 86 and an acceptance of the modification. The modifications or acceptances of the threat-specific candidate properties are incorporated as feedback training data 82 which is used to train the one or more neural networks of the second text miner 68 of the second artificial intelligence model 36 using feedback training based upon the threat property adoption user input 80.

Once the cybersecurity threats and their constituent properties meet with the user's approval, the user can instruct the threat template editor 70 to generate a list of cybersecurity threats 902 including the cybersecurity threats 902 and information about each identified cybersecurity threat 902. Response to the user's approval, the threat template editor 70 is configured to generate a set of cybersecurity threat characteristics 75 including a list of cybersecurity threats 902 and the cybersecurity threat characteristics for each of the cybersecurity threats 902 based on the threat property adoption user input 80 and defined threat template data 72a. This list of cybersecurity threats 902 and the cybersecurity threat characteristics 75 is subsequently displayed by the graphical user interface 76. In this manner, the artificial intelligence threat modeling assistant 70a can prepopulate a threat model with candidate cybersecurity threats 902 and properties 86 of said cybersecurity threats, and the user can modify these cybersecurity threats 902 and properties 86 as needed until satisfaction.

Further referring to FIG. 2D, in this example of a practical application of a threat modeling interface 74, the second text miner 68 mines unstructured data from unstructured text sources including threat-related text sources 910, extracts features of at least one cybersecurity threat 902 from these text sources 910, and feeds extracted features of the at least one cybersecurity threat 902 into the artificial intelligence threat modeling assistant 70a, which subsequently identifies cybersecurity threats 902 and their interrelationships with system elements 54a, and populates the threat templates 72 for each identified cybersecurity threat 902 with threat-specific candidate properties 86 for that threat. Possible cybersecurity threats 902 include, but are not limited to, tampering threats, repudiation threats, information disclosure threats, Denial of Service attacks, and Elevation of Privilege threats.

Figure 8:
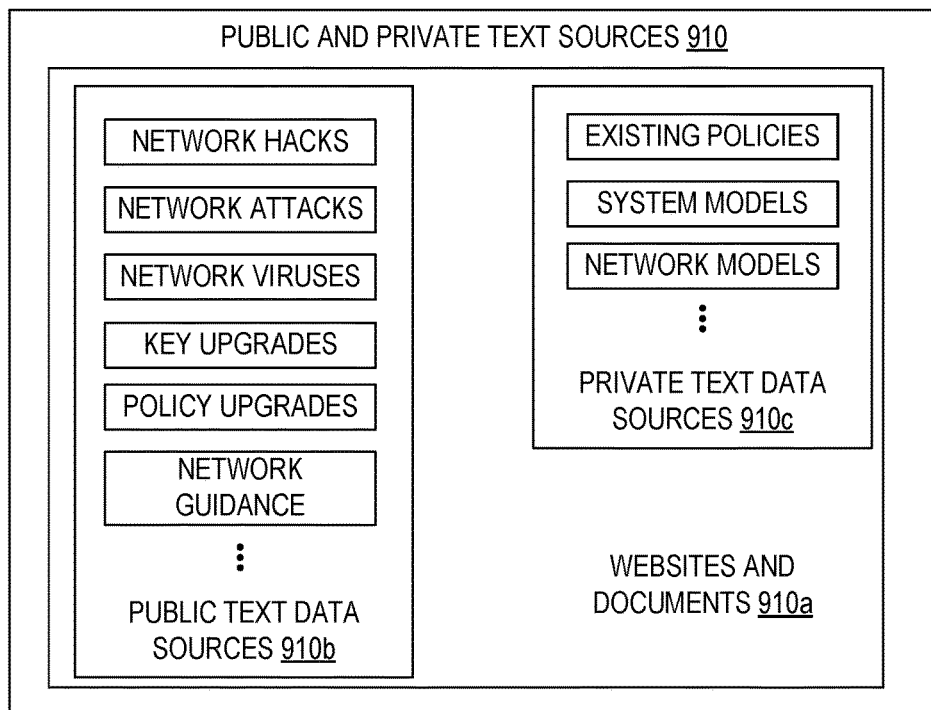
FIG. 8 is a schematic diagram illustrating an example of public and private text sources that are mined by the text miners of the security computing system of FIG. 1.

Referring to FIG. 8, threat-related text sources 910 include web sites and documents 910a, which include public text data sources 910b and private text data sources 910c. These text data sources 910b, 910c can include threat databases, vulnerability databases, and IT security documents containing information regarding network hacks, network attacks, network viruses, key upgrades, policy upgrades, network guidance, existing IT security policies, system models, network models, and others.

In the example of FIG. 2D, the identified cybersecurity threat 902 is the tampering of process memory. The identified threat features include the source process, the target process, and the code type. However, the source and the target can be entities other than processes, including data stores, external interactors, data stores, log data, SQL database, web server, web application, and authorization providers. Other identified threat features can include what boundaries the data flows cross, where authentication occurs, the type of authorization mechanism, type of data flows (including HTTP, HTTPS flow), type of payload (including JSON).

For each cybersecurity threat, the threat modeling assistant 70a provides a graphical user interface 76 to display the threat-specific candidate properties 86 in a threat template editor region 78 as suggestions 84, and receive a threat property adoption user input 80 for each of the threat-specific candidate properties 86 for each identified cybersecurity threat 902, allowing for a user, i.e., human operator 904, to provide user input 80 to accept or reject each of the threat-specific candidate properties 86 that are assigned to each cybersecurity threat 902 in the threat template 72. In this example, the user can provide input 80 via the graphical user interface 76 to accept or modify configurable threat features accordingly for the identified cybersecurity threat 902, including modifying the priority level of the identified cybersecurity threat 902 to "high." The modifications 82b or acceptances 82a of the threat-specific candidate properties 86 are incorporated as feedback training data 82 which is used to train the one or more neural networks 66 of the second text miner 68 of the second artificial intelligence model 36 using feedback training based upon the threat property adoption user input 80.

Responsive to the user's approval, the threat modeling assistant 70a subsequently generates a set of cybersecurity threat characteristics 75 including a list of cybersecurity threats and cybersecurity threat characteristics for each of the cybersecurity threats 902 based on the threat property adoption user input 80. The list of cybersecurity threats 902 and the cybersecurity threat characteristics 75 are then displayed in the graphical user interface 76.

Referring to FIG. 2A, a threat analyzer 88 is configured to perform an analysis of a risk posed by each cybersecurity threat 902 to each element 54a of the computer system 900 based at least on the security categories of the classified cybersecurity threats and the security categories of the classified elements 54a of the computer system 900. The threat analyzer 88 includes a third artificial intelligence model 38 including a third neural network 90 that has been trained on a third training data set including classified system elements 43, classified threats 65, and user inputted security recommendations, and is configured to, at run-time, receive run-time input of classified system elements 54a for a target computer system 900 and classified cybersecurity threats for a target cybersecurity threat, and in response output a predicted security recommendation 92 for each classified system element and classified threat pair of the target computer system 900. Like the first neural network 44 and the second neural network 66, the third neural network 90 can be trainable with paired input and output data, and include an input layer, one or more fully connected hidden layers, and an output layer, nodes in each layer being linked by weighted associations, the weights between nodes being adjusted by a backpropagation algorithm according to a loss function during training, the input layer including a plurality of nodes corresponding to parameters of the input vector, the output layer including a plurality of output nodes, each corresponding to one of a plurality of predicted security recommendations 92.

The threat analyzer 88 can be configured to identify a measure of current risk of the cybersecurity threat to a particular element, sometimes be referred to as a current-risk rating, and identify a suggested mitigation implementable to reduce the current-risk rating to a lower, measure of residual risk, which can sometimes be referred to as a residual-risk rating.

The threat analyzer 88 can be configured to generate one or more reports 94 from the threat analysis, at least one of which can include an organized arrangement of at least some of the attributes of at least some of the components, data flows or cybersecurity threat. In some examples, the report 94 can include for each of one or more cybersecurity threats, a description of the cybersecurity threat and a vulnerability giving rise thereto, impact rating (e.g., independent of current security controls or suggested mitigation), any current security controls, likelihood rating, current-risk rating, suggested security mitigation strategies, suggested policy updates, suggested policy limitations, suggested design limitations, suggested design updates, suggested mitigation techniques, concrete security recommendations, residual-risk rating, element(s) of the target computer system 900 to which the cybersecurity threat 902 is applicable, and the like. A plurality of reports 94 can be compiled and outputted as a report log 95.

Suggested mitigation strategies can include doing nothing, removing the feature, turning off the feature, warning the user, or countering the threat with technology. Suggested operational mitigation strategies using technology can include IP address verification, rate limiting, access control lists (ACLs), detecting known malicious threats, and/or detecting traffic anomalies.

Suggested mitigation techniques can include authentication, integrity controls, digital signatures, secure auditing and logging, secure time-stamps, trusted third parties, encryption, filtering (egress filtering, ingress filtering, others), privilege ownership, group membership, permissions, and/or priority based servicing.

Suggested security recommendations 92 can include the following, as some examples.

Ensure network traffic is marked with a priority attribute, and network queues are managed by priority.

Upstream routers shall apply limitations to the packet stream.

To implement packet inspection mechanism on packets exiting the network perimeter.

Add rule to detect bad packet such as source address spoofing, and to stop connections to known command and control servers.

Implement packet drop mechanism e.g. a packet with a source address that could not possibly have come from its originating network.

Add IP address spoofing guideline to the policy.

Implement rate limiting mechanism e.g. NTP packets, can be dropped once they reach a certain point.

Perform network characterization, with thresholds to reflect the extent of normal.

System recommendations 92 can include detected faults which can include the following, as some examples.

Priority queues not implemented.

No rules found for packet streaming under policy.

No proper packet handling if implemented

No rule found for address spoofing under policy.

Trace back mechanism missing.

No rate limiting mechanism.

A threat monitoring interface 96 is configured to display the predicted security recommendation 92, and receive from a user (i.e., human operator 904) an adoption input data 98 on a recommendation adoption interface 99 indicating whether or not the security recommendation 92 is to be adopted for the computer system 900. The adoption input data 98 is then fed back for feedback training to the third artificial intelligence model 38. An implementation engine 100 can be provided including a sandbox 102 configured to securely test implantation of a security update 104 designed in accordance with the security recommendation 92 on a simulation of the computer system 900. The implementation can, upon receiving approval from the user, output the security update 104 to the computer system 900 for installation and execution.

Figure 3:
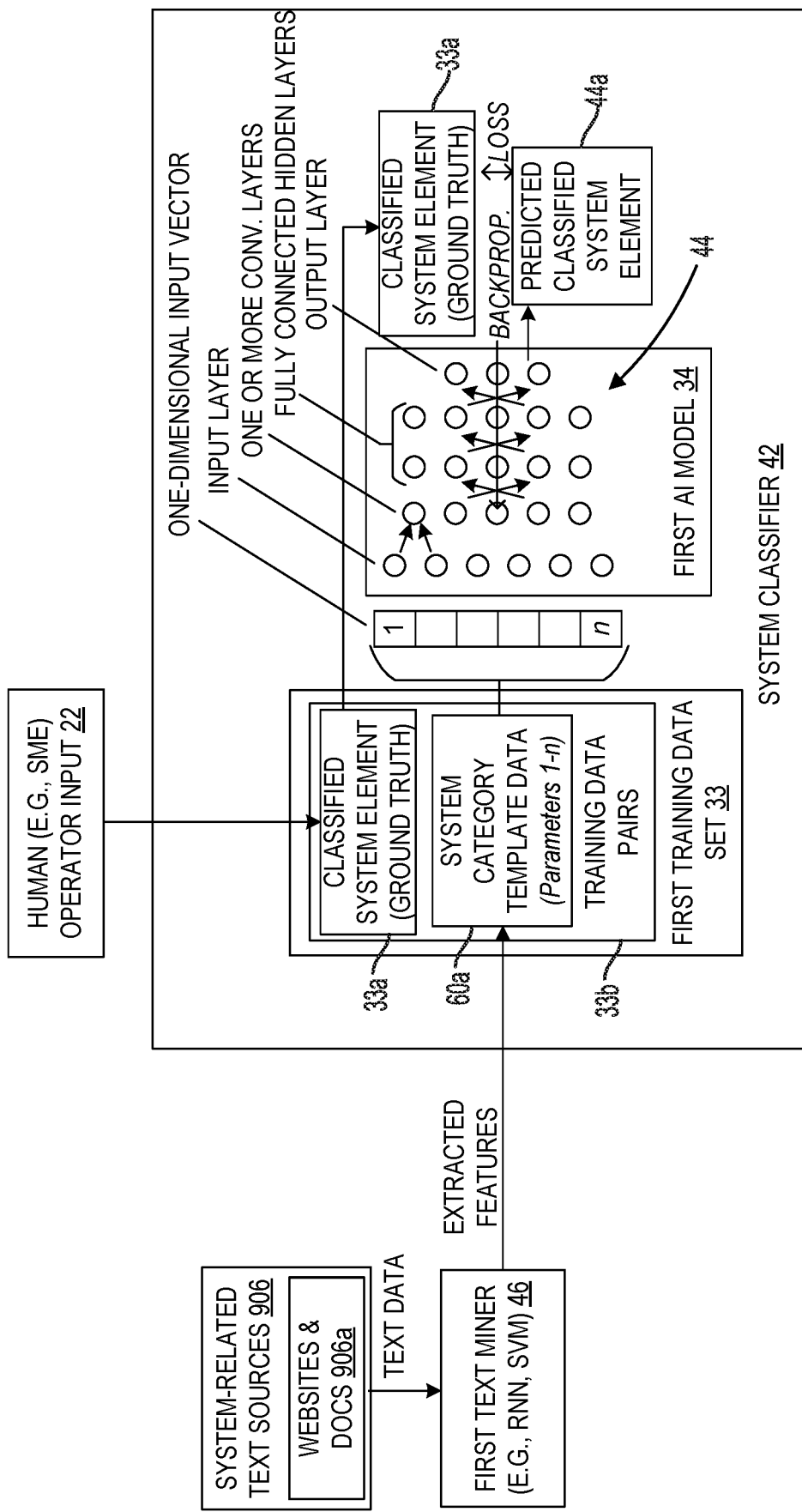
FIG. 3 is a schematic diagram illustrating the training of the system classifier of the security computing system of FIG. 1.

Referring to FIG. 3, the training of the system classifier 42 is described. The system classifier 42 receives extracted features from the first text miner 46 relating to the target computer system, which are included in a first training data set 33 used to train a computer system model 34. For each vector (i.e., ordered set) of extracted features from the first text miner 46, the first training data set 33 includes a classified system element 33a, designated as ground truth, which is received as a human operator input 22 from human operators 904. In this way, human operators 904 who are subject matter experts provide the ground truth of the system classification for the extracted features. In this way, ground truth classifications for system elements are paired with feature vectors of extracted features received from the first text miner 46 and stored as system element template data 60a in the first training data set 33. The system element template data 60a containing the extracted features of the target computer system is fed as input into the first neural network 44 of the first artificial intelligence model 34, the ground truth classified system elements are fed as outputs into the first artificial intelligence model 34, and the first neural network 44 is trained to minimize the error or loss between the predicted classified system element 44a from the first neural network 44 and ground truth classified system element 33a through adjusting the weights between nodes in each layer of the first neural network 44 via a backpropagation algorithm. On the input side, the first training data set 33 is decomposed into multiple convolutional layers in a convolutional system classification neural network 44 to train the convolutional system classification neural network 44. By training the system classifier 42 with a large number of system element template data 60a— classified system element 33a training data pairs 33b of the first training data set 33 at training time, the system classifier 42 can be successfully trained to classify such system element template data 60a into predicted classified system elements 44a at run time, with greater accuracy.

Figure 4:
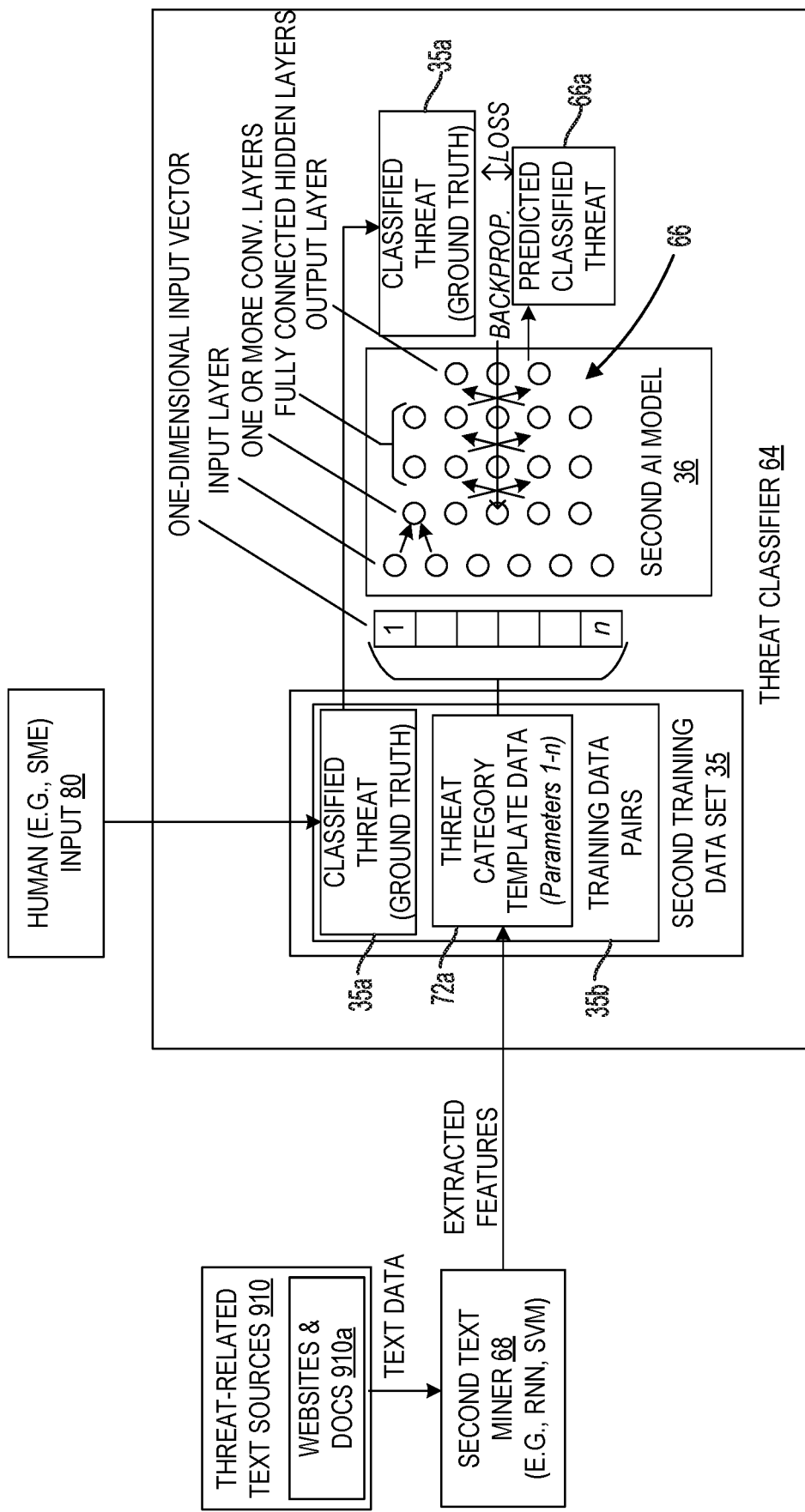
FIG. 4 is a schematic diagram illustrating the training of the threat classifier of the security computing system of FIG. 1.

Referring to FIG. 4, the training of the threat classifier 64 is described. The threat classifier 64 receives from the second text miner 68 extracted features relating to the target cybersecurity threat, which are included in a second training data set 35 used to train a cybersecurity threat model 36. For each vector (i.e., ordered set) of extracted features, the second training data set 35 also includes a classified threat 35a, which is designated as ground truth, and which is received as a human operator input 80 from human operators 904, such as subject matter experts. These human operator inputs 80 provide input to the second training data set 35 to specify the ground truth, or the true classification for the classified threat 35a. In this way, ground truth classified threats 35a are paired in training data pairs 35b with feature vectors of extracted features received from the second text miner 68 in the second training data set 35 and stored as the threat template data 72a. The threat template data 72a containing the extracted features of the text data is fed as input into the second neural network 66 of the second artificial intelligence model 36, the ground truth classified threats 65 are fed as outputs into the second artificial intelligence model 36, and the second neural network 66 is trained to minimize the error or loss between the predicted classified threat 66a from the second neural network 66 and the ground truth classified threat 35a through adjusting the weights between nodes in each layer of the second neural network 66 via a backpropagation algorithm. On the input side, the second training data set 35 is decomposed into multiple convolutional layers in a convolutional threat classification neural network 66 as it passes from the input side to output side of the convolutional threat classification neural network 66. By training the threat classifier 64 with a large number of threat category template data 72a—classified threat 35a training data pairs 35b at training time, the threat classifier 64 can be successfully trained to classify such template data into predicted classified threats 66a at run time.

Figure 5:
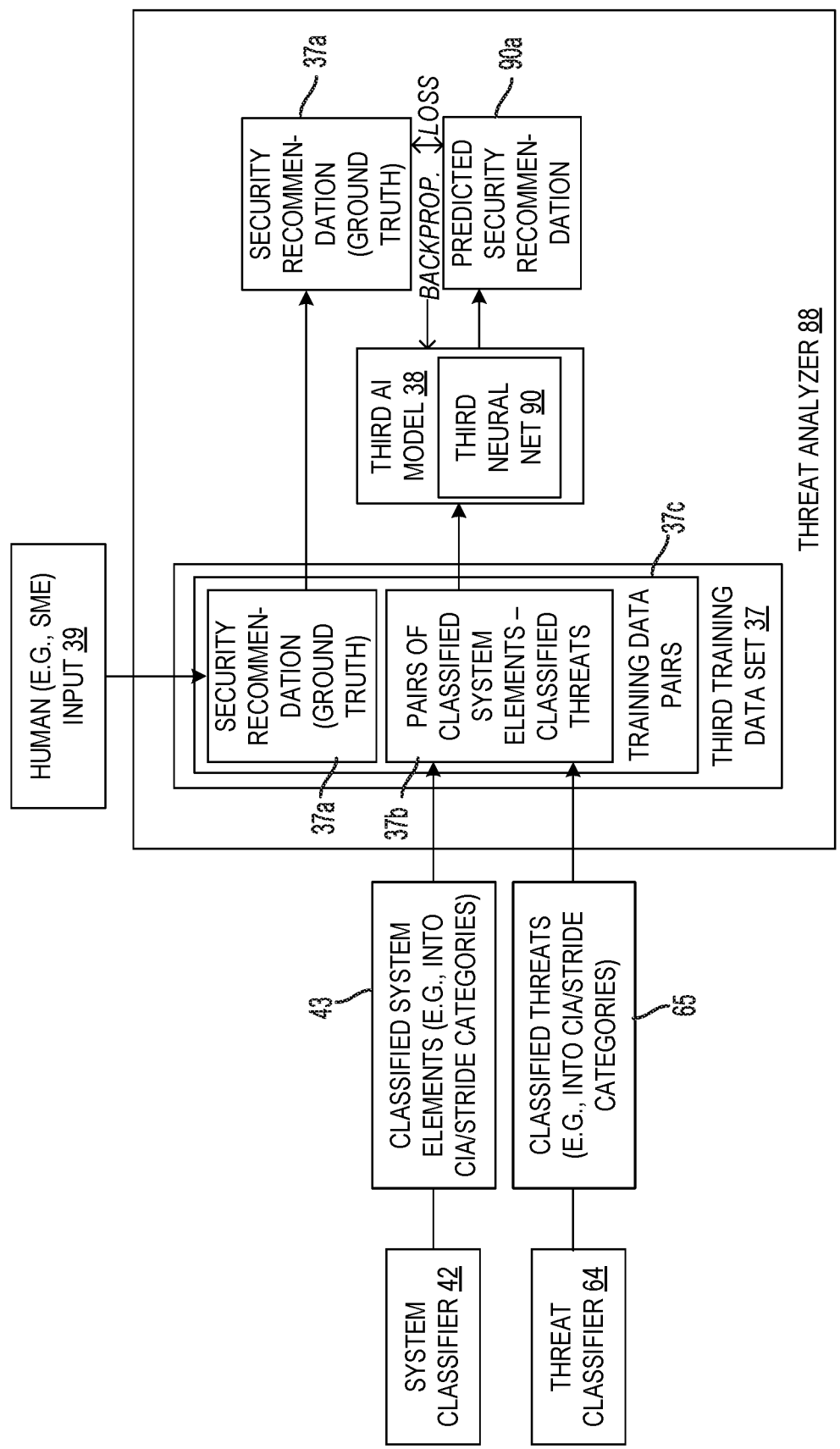
FIG. 5 is a schematic diagram illustrating the training of the threat analyzer of the security computing system of FIG. 1.

Referring to FIG. 5, the training of the threat analyzer 88 is described. The threat analyzer 88 receives pairs of classified system elements and classified threats, which are included in a third training data set 37 used to train a third artificial intelligence model 38, which is a security recommendation classification model. For each training data pair of classified system elements and classified threats 37b, the third training data set 37 also includes a security recommendation classification 37a which is designated as ground truth, which is received as a human operator input 39 from human operators 904, such as a subject matter expert. Each pair of (a) pairs 37b and (b) security recommendation classification 37a forms a respective training data pair 37c within the third training data set 37. These human operators 904, who are subject matter experts, provide input to the third training data set 37 to specify the security recommendation classification 37a as ground truth for each set of pairs 37b, thereby providing true security recommendations for training. The pairs 37b of classified system elements and classified threats are fed as input into the third neural network 90 of the third artificial intelligence model 38, the ground truth security recommendations 37a are fed as outputs into the third neural network of the third artificial intelligence model 38, and the third neural network 90 of the third artificial intelligence model 38 is trained to minimize the error or loss between the predicted security recommendation 90a from neural network 90 and the ground truth security recommendation 37a through adjusting the weights between nodes in each layer of the third neural network 90 via a backpropagation algorithm. On the input side, the third training data set 37 is decomposed into multiple convolutional layers in a convolutional security recommendation classification neural network 90 to train the convolutional security recommendation classification neural network 90. By training the threat analyzer 88 with a large number of training data pairs 37c at training time, the threat analyzer 88 can be successfully trained to classify such pairs of classified system elements and classified threats 37b into predicted security recommendations 90a at run time.

Figure 9:
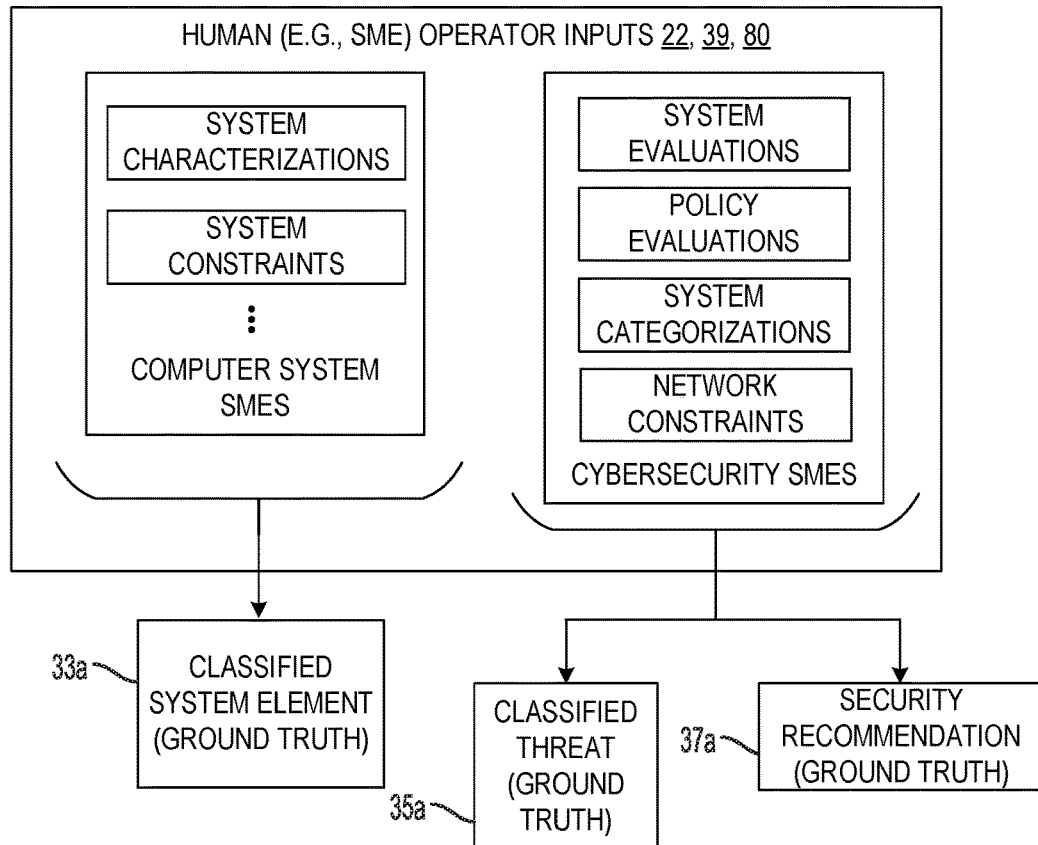
FIG. 9 is a schematic diagram illustrating an example of subject matter expert (SME) inputs that are used in the security computing system of FIG. 1.

Referring to FIG. 9, a block diagram illustrates an example of subject matter expert (SME) inputs 22, 39, and 80 that are used to train the neural networks in the security computing system 10 of FIG. 1. These inputs 22, 39, and 80 can include system characterizations and system constraints and other system characteristics of the target computer system 900 received from computer system SMEs, as well as system evaluations, policy evaluations, system categorizations, network constraints and other threat related characteristics of target cybersecurity threats 902 from cybersecurity SMEs. As previously discussed, since the inputs 22, 39, and 80 come from SMEs, they are treated as ground truth. These inputs 22, 39, and 80 specify the classified system elements 33a, the classified threats 35a, and classified security recommendations 37a discussed previously in relation to FIGS. 3-5.

Figure 10A:
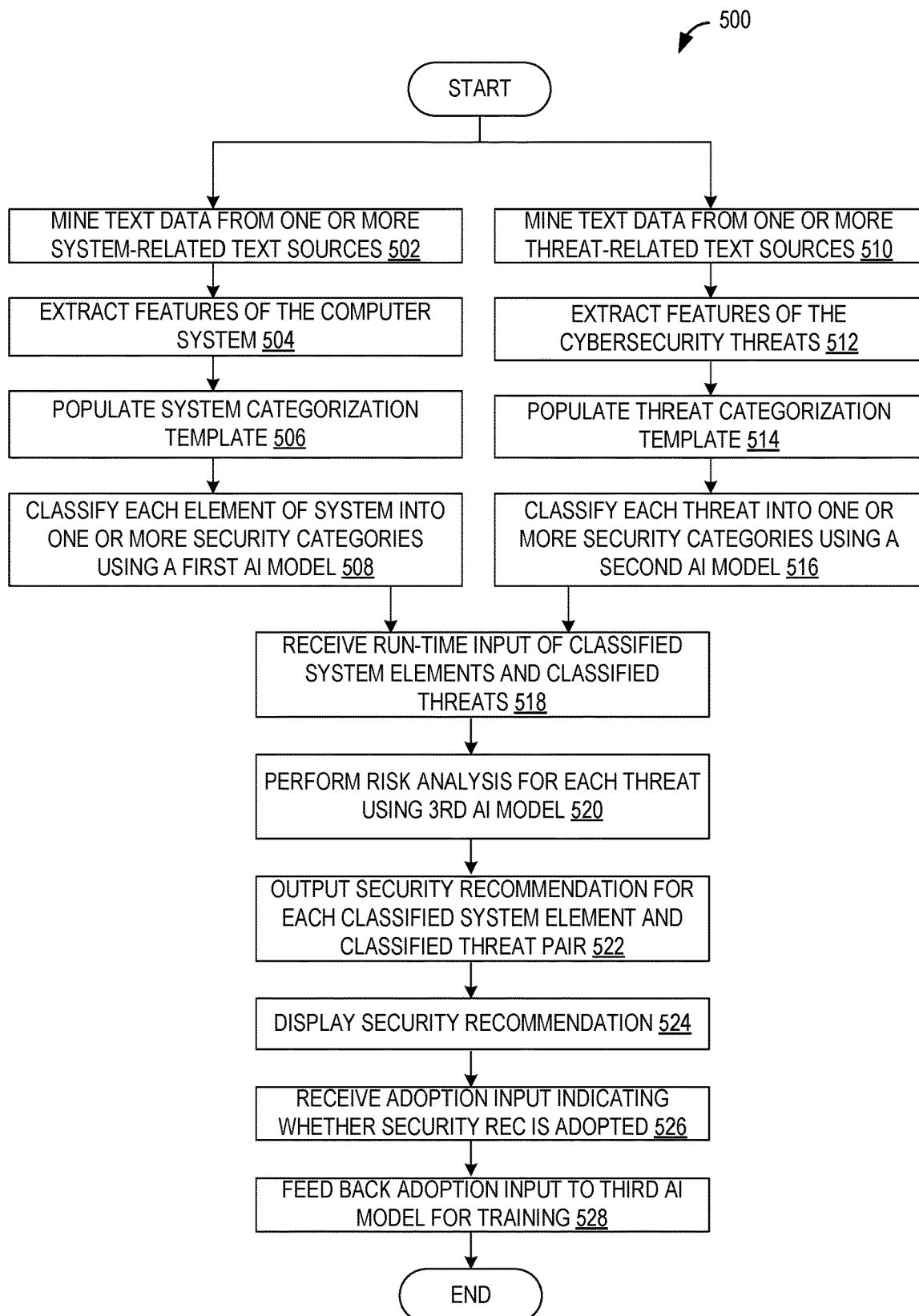
FIG. 10A is a flowchart of a method for evaluating a security risk of a target computer system according to an embodiment of the subject disclosure.

In FIG. 10A, a method 500 is illustrated for outputting a security recommendation for a computer system, according to one example implementation. The following description of method 500 is provided with reference to the software and hardware components described above and shown in FIGS. 1 through 2D. It will be appreciated that method 500 also can be performed in other contexts using other suitable hardware and software components. At step 502, text data from one or more system-related text sources is mined. At step 504, features of the computer system are extracted. At step 506, a system categorization template is populated. At step 508, each element of the system is classified into one or more defined security categories using a first artificial intelligence model.

In parallel to the classification of the system elements, at step 510, text data from one or more threat-related text sources is mined. At step 512, features of the cybersecurity threats are extracted. At step 514, a threat categorization template is populated. At step 516, each threat is classified into one or more defined security categories using a second artificial intelligence model.

At step 518, run-time input of classified system elements and classified cybersecurity threats is received. At step 520, risk analysis is performed for each threat using a third artificial intelligence model. At step 522, a security recommendation is outputted for each classified system element and classified threat pair. At step 524, a security recommendation is displayed. At step 526, adoption input data is received from a user indicating whether the security recommendation is adopted. At step 528, the adoption input data is fed back to the third artificial intelligence model for training.

Figure 10B:
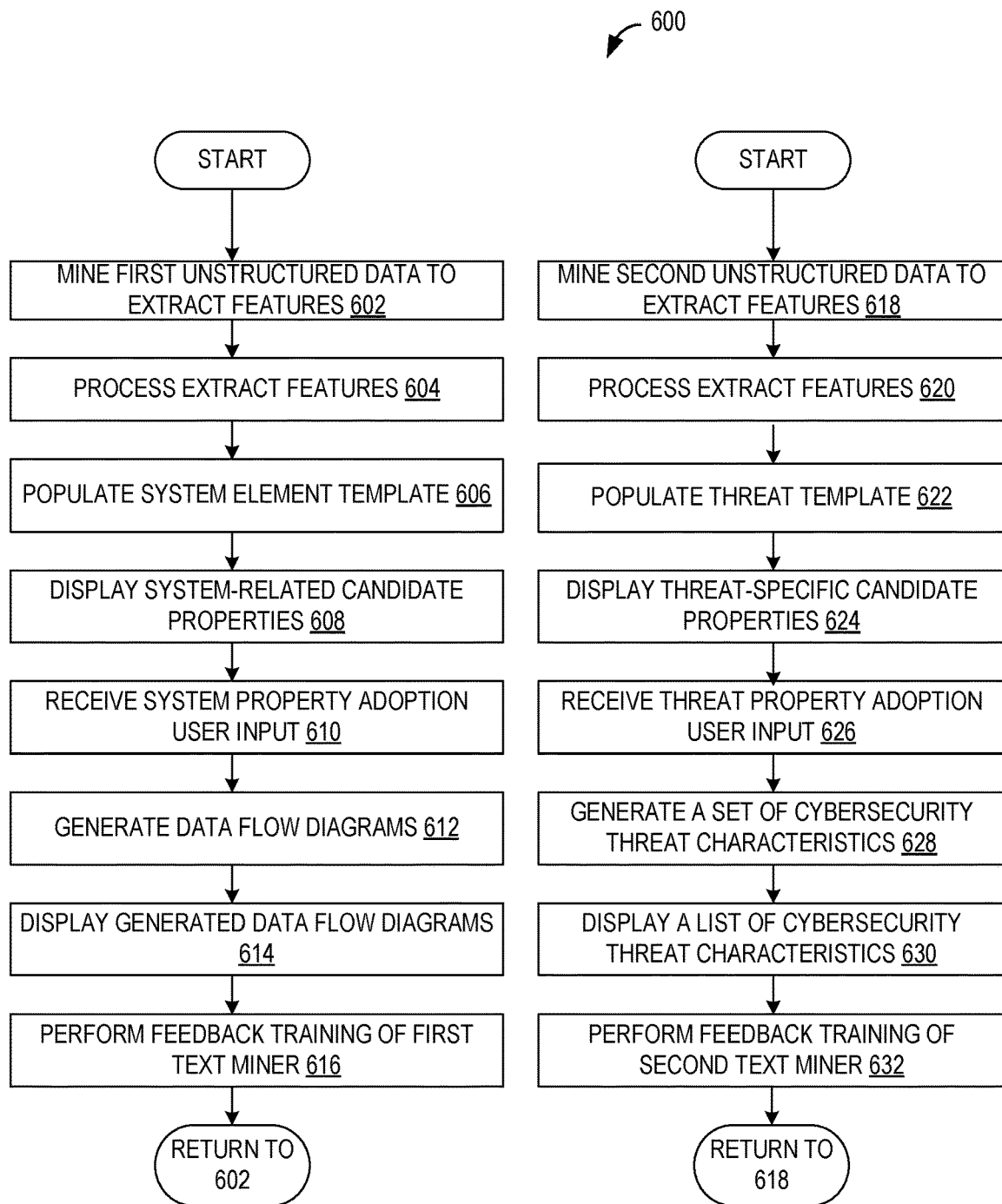
FIG. 10B is a flowchart of a method for generating data flow diagrams and a list of cybersecurity threats having the cybersecurity threat characteristics according to an embodiment of the subject disclosure.

At FIG. 10B, a method 600 for generating data flow diagrams and a list of cybersecurity threats having the cybersecurity threat characteristics is described for execution at one or more processors of a cybersecurity computing system. The following description of method 600 is provided with reference to the software and hardware components described above and shown in FIGS. 1 and 2. It will be appreciated that method 600 also can be performed in other contexts using other suitable hardware and software components.

At step 602, first unstructured data is mined from first unstructured text sources to extract features of a target computer system. The target computer system can be an on-board computing system deployed on an aircraft, an aircraft informatics computing system deployed at a base station and configured to communicate with an aircraft on-board computing system, or an aircraft manufacturing computing system utilized in the manufacturing of aircraft or aircraft components. The mining of unstructured text sources can include the processing of the unstructured text sources using a text miner that includes one or more neural networks.

At step 604, extracted features are processed to identify system elements of the target computer system and interrelationships between the identified system elements, and to identify system-related candidate properties of the system elements. At step 606, a system element template is populated for each identified system element with the system-related candidate properties for that element. At step 608, the system-related candidate properties are displayed for each system element in a data flow diagram region. At step 610, a system property adoption user input is received for each system-related candidate property of each identified system element. The system property adoption user input includes an indication of whether to accept or reject each of the system-related candidate properties, and further includes a modification to at least one system-related candidate property and an acceptance of the modification.

At step 612, data flow diagrams are generated containing each identified system element having the candidate properties adopted according to the system property adoption user input. At step 614, the generated data flow diagrams are displayed on a graphical user interface. At step 616, feedback training of the one or more neural networks is performed based upon the system property adoption user input, and the method 600 returns to step 602.

At step 618, the method 600 further includes mining second unstructured text sources to extract features of one or more cybersecurity threats. The mining of the second unstructured text sources includes processing the second unstructured text sources using a second text miner that includes one or more neural networks. At step 620, the extracted features are processed to identify cybersecurity threats associated with the extracted features and interrelationships between the cybersecurity threats and the system elements.

At step 622, a threat template is populated for each identified cybersecurity threat with threat-specific candidate properties for that threat. At step 624, the threat-specific candidate properties are displayed in a threat template editor region of the graphical user interface. At step 626, a threat property adoption user input is received for each of the threat-specific candidate properties for each identified cybersecurity threat. The threat property adoption user input includes an indication of whether to accept or reject each of the threat-specific candidate properties.

At step 628, a set of cybersecurity threat characteristics is generated including a list of cybersecurity threats and the cybersecurity threat characteristics for each of the cybersecurity threats based on the threat property adoption user input. At step 630, the list of cybersecurity threats having the cybersecurity threat characteristics is displayed in the graphical user interface. At step 632, feedback training of the one or more neural networks of the second text miner is performed based upon the threat property adoption user input and the method 600 returns to step 618.

The systems and processes described herein have the potential benefit of increasing the cybersecurity of a computer system that accounts for the specific architecture of the computer system, applies artificial intelligence to augment and complement human assessment of cyber vulnerabilities of systems and networks, and protects the computer system from future cyber-attacks.

Figure 11:
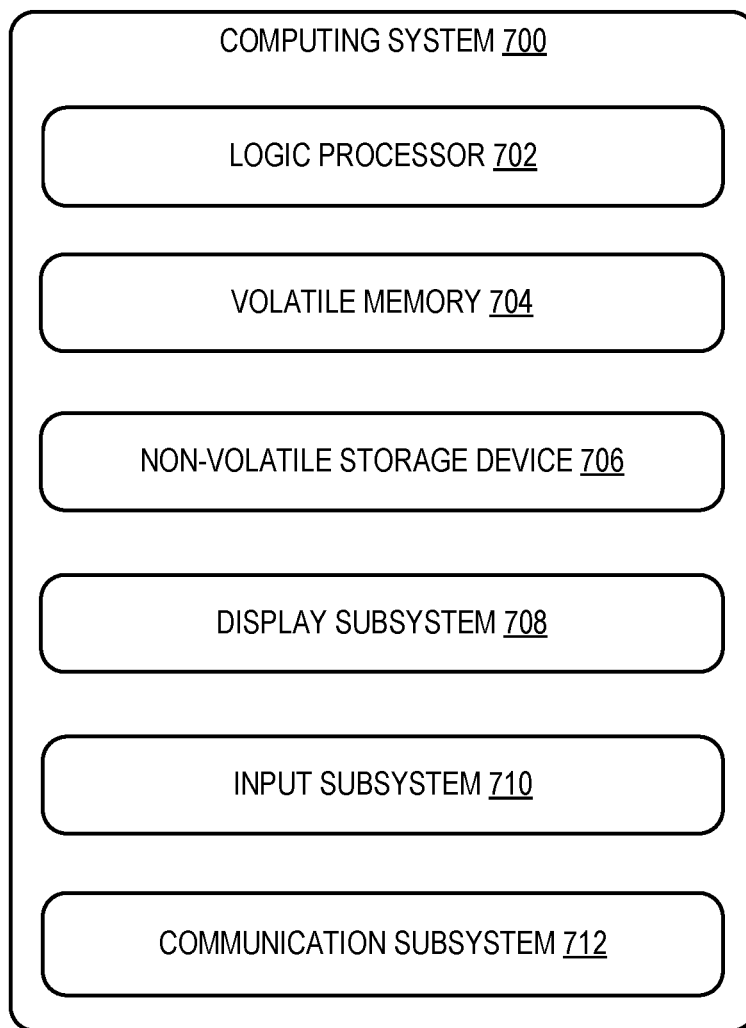
FIG. 11 is a schematic diagram illustrating an exemplary computing system that can be used to implement the security computing system of FIG. 1.

FIG. 11 illustrates an exemplary computing system 700 that can be utilized to implement the security computing system 10 and the security methods 500, 600 described above. Computing system 700 includes a logic processor 702, volatile memory 704, and a non-volatile storage device 706. Computing system 700 can optionally include a display subsystem 708, input subsystem 710, communication subsystem 712 connected to a computer network, and/or other components not shown in FIG. 11. These components are typically connected for data exchange by one or more data buses when integrated into single device, or by a combination of data buses, network data interfaces, and computer networks when integrated into separate devices connected by computer networks.

The non-volatile storage device 706 stores various instructions, also referred to as software, that are executed by the logic processor 702. Logic processor 702 includes one or more physical devices configured to execute the instructions. For example, the logic processor 702 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 702 can include one or more physical processors (hardware) configured to execute software instructions. Additionally or alternatively, the logic processor 702 can include one or more hardware logic circuits or firmware devices configured to execute hardware-implemented logic or firmware instructions. Processors of the logic processor 702 can be single-core or multi-core, and the instructions executed thereon can be configured for sequential, parallel, and/or distributed processing. Individual components of the logic processor 702 optionally can be distributed among two or more separate devices, which can be remotely located and/or configured for coordinated processing. Aspects of the logic processor 702 can be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 can be transformed—e.g., to hold different data.

Non-volatile storage device 706 can include physical devices that are removable and/or built-in. Non-volatile storage device 706 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 can include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 can include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the security computing system 10 typically implemented in software by a processor to perform a particular function using portions of volatile memory, which function involves transformative processing that specially configures the processor to perform the function. Thus, a module, program, or engine can be instantiated via logic processor 702 executing instructions held by non-volatile storage device 706, using portions of volatile memory 704. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 708 typically includes one or more displays, which can be physically integrated with or remote from a device that houses the logic processor 702. Graphical output of the logic processor executing the instructions described above, such as a graphical user interface, is configured to be displayed on display subsystem 708.

Input subsystem 710 typically includes one or more of a keyboard, pointing device (e.g., mouse, trackpad, finger operated pointer), touchscreen, microphone, and camera. Other input devices can also be provided.

Communication subsystem 712 is configured to communicatively couple various computing devices described herein with each other, and with other devices. Communication subsystem 712 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 700 to send and/or receive messages to and/or from other devices via a network such as the Internet. It will be appreciated that one or more of the computer networks via which communication subsystem 712 is configured to communicate can include security measures such as user identification and authentication, access control, malware detection, enforced encryption, content filtering, etc., and can be coupled to a wide area network (WAN) such as the Internet.

Further, the disclosure comprises configurations according to the following clauses.

Clause 1. A computing system, comprising: a processor and a memory storing executable instructions that, in response to execution by the processor, cause the computing system to implement at least: a system classifier comprising a first artificial intelligence model configured to classify each of a plurality of elements of a target computer system into one or more defined security categories of a security categorization model; a threat classifier comprising a second artificial intelligence model configured to classify each of a plurality of identified cybersecurity threats into the one or more defined security categories; a threat analyzer configured to: perform an analysis of a risk posed by each cybersecurity threat of the plurality of identified cybersecurity threats to each element of the plurality of elements of the target computer system based at least on the one or more defined security categories of the classified cybersecurity threats and the one or more defined security categories of the classified elements of the target computer system, and output a security recommendation based on the analysis.

Clause 2. The computing system of clause 1, wherein the first artificial intelligence model comprises a first text miner configured to mine text data from one or more system-related text sources, extract features of the target computer system, and populate a system categorization template with the extracted features of the target computer system.

Clause 3. The computing system of clauses 1 or 2, wherein the first text miner comprises one or more recurrent neural networks configured to perform textual analysis comprising at least one of the group consisting of: text classification, text clustering, concept or entity extraction, production of granular taxonomies, sentiment analysis, document summarization, and entity relation modeling.

Clause 4. The computing system of any of clauses 1 to 3, wherein the first artificial intelligence model comprises a first neural network that has been trained on a first training data set that comprises system element template data and one or more user inputted system categories of the target computer system, and is configured to, at run-time, for each of the plurality of elements of the target computer system, receive as run-time input data a run-time system categorization template and in response classify each system element into the one or more defined security categories.

Clause 5. The computing system of any of clauses 1 to 4, wherein the second artificial intelligence model comprises a second text miner configured to mine text data from one or more threat-related text sources, extract features of the identified cybersecurity threat, and populate a threat categorization template with the extracted features of the target computer system.

Clause 6. The computing system of any of clauses 1 to 5, wherein the second text miner comprises one or more recurrent neural networks configured to perform textual analysis comprising at least one of the group consisting of: text classification, text clustering, concept or entity extraction, production of granular taxonomies, sentiment analysis, document summarization, and entity relation modeling.

Clause 7. The computing system of any of clauses 1 to 6, wherein the second artificial intelligence model comprises a second neural network that has been trained on a second training data set that comprises threat template data and one or more user inputted threat categories of the identified cybersecurity threats, and is configured to, at run-time, for each of a plurality of elements of a target cybersecurity threat, receive as run-time input run-time threat template data and in response classify the target cybersecurity threat into the one or more defined security categories.

Clause 8. The computing system of any of clauses 1 to 7, wherein the threat analyzer comprises a third artificial intelligence model comprising a third neural network that has been trained on a third training data set comprising classified system elements, classified threats, and user inputted security recommendations, and is configured to, at run-time, to receive run-time input of classified system elements for the target computer system and classified cybersecurity threats for a target cybersecurity threat, and in response output a predicted security recommendation for each classified system element and classified threat pair of the target computer system.

Clause 9. The computing system of any of clauses 1 to 8, wherein the third neural network is trainable with paired input and output data, and comprises an input layer, one or more fully connected hidden layers, and an output layer, nodes in at least one of the input layer, hidden layers, or output layers being linked by weighted associations, weights between the nodes being adjusted by a backpropagation algorithm according to a loss function during training, the input layer comprising a plurality of nodes corresponding to parameters of an input vector, the output layer comprising a plurality of output nodes, each corresponding to one of a plurality of predicted security recommendations.

Clause 10. The computing system of any of clauses 1 to 9, further comprising: a threat monitoring interface configured to facilitate a display of the predicted security recommendation, and receive from a user device adoption input data indicating whether or not the security recommendation is to be adopted for the target computer system.

Clause 11. The computing system of any of clauses 1 to 10, wherein the adoption input data is fed back for feedback training to the third artificial intelligence model.

Clause 12. The computing system of any of clauses 1 to 11, further comprising an implementation engine comprising a sandbox configured to securely test implantation of a security update designed in accordance with the security recommendation on a simulation of the target computer system.

Clause 13. The computing system of any of clauses 1 to 12, wherein the implementation engine is configured to, upon receiving approval from a user, output the security update to the target computer system for installation and execution.

Clause 14. The computing system of any of clauses 1 to 13, wherein the security categorization model is selected from the group consisting of a STRIDE (Spoofing, Tampering, Repudiation, Information Disclosure, Denial of Service, Elevation of Privilege) model and a CIA (Confidentiality, Integrity, Availability) model.

Clause 15. A computing method, comprising: classifying each of a plurality of elements of a target computer system into one or more defined security categories of a security categorization model, using a first artificial intelligence model; classifying each of a plurality of identified cybersecurity threats into the one or more defined security categories using a second artificial intelligence model; performing an analysis of a risk posed by each cybersecurity threat of the plurality of identified cybersecurity threats to each element of the plurality of elements of the target computer system based at least on the one or more defined security categories of the classified cybersecurity threats and the one or more defined security categories of the classified elements of the target computer system; and outputting a security recommendation based on the analysis.

Clause 16. The computing method of clause 15, wherein the first artificial intelligence model comprises a first text miner configured to mine text data from one or more system-related text sources, extract features of the target computer system, and populate a system categorization template with the extracted features of the target computer system; the first text miner comprises one or more recurrent neural networks configured to perform textual analysis comprising at least one of the group consisting of: text classification, text clustering, concept or entity extraction, production of granular taxonomies, sentiment analysis, document summarization, and entity relation modeling; and the first artificial intelligence model comprises a first neural network that has been trained on a first training data set that comprises system element template data and one or more user inputted system categories of the target computer system, and is configured to, at run-time, for each of the plurality of elements of the target computer system, receive as run-time input data a run-time system categorization template and in response classify each system element into the one or more defined security categories.

Clause 17. The computing method of clauses 15 or 16, wherein the second artificial intelligence model comprises a second text miner configured to mine text data from one or more threat-related text sources, extract features of the identified cybersecurity threats, and populate a threat categorization template with the extracted features of the target computer system; the second text miner comprises one or more recurrent neural networks configured to perform textual analysis comprising at least one of the group consisting of: text classification, text clustering, concept or entity extraction, production of granular taxonomies, sentiment analysis, document summarization, and entity relation modeling; and the second artificial intelligence model comprises a second neural network that has been trained on a second training data set that comprises threat template data and one or more user inputted threat categories of the identified cybersecurity threats, and is configured to, at run-time, for each of a plurality of elements of a target cybersecurity threat, receive as run-time input run-time threat template data and in response classify the target cybersecurity threat into the one or more defined security categories.

Clause 18. The computing method of any of clauses 15 to 17, further comprising performing the analysis of the risk posed by each cybersecurity threat using a third artificial intelligence model comprising a third neural network that has been trained on a third training data set comprising classified system elements, classified threats, and user inputted security recommendations; and at run-time, receiving run-time input of classified system elements for the target computer system and classified cybersecurity threats for a target cybersecurity threat, and in response outputting a predicted security recommendation for each classified system element and classified threat pair of the target computer system.

Clause 19. A computing method, comprising: classifying elements of a target computer system into one or more defined security categories of a security categorization model; classifying an identified cybersecurity threat into the one or more defined security categories; performing an analysis of a risk posed by the cybersecurity threat to each element of the target computer system using an artificial intelligence model comprising a neural network that has been trained on a training data set comprising classified system elements, classified threats, and user inputted security recommendations, wherein at run-time the neural network receives run-time input of classified system elements for the target computer system and classified cybersecurity threats for a target cybersecurity threat, and in response outputs a predicted security recommendation for each classified system element and classified threat pair of the target computer system; and outputting the predicted security recommendation based on the analysis.

Clause 20. The computing method of clause 19, further comprising: displaying the predicted security recommendation; and receiving from a user device adoption input data indicating whether or not the security recommendation is to be adopted for the target computer system; wherein the adoption input is fed back for feedback training to the neural network.

Clause 21. A cybersecurity computing system, comprising: a processor and a memory storing executable instructions that, in response to execution by the processor, cause the processor to implement at least: an artificial intelligence model comprising: a text miner configured to mine unstructured data from unstructured text sources and extract one or more features of a target computer system, and a data flow diagram editor configured to process the one or more features to identify system elements of the target computer system and interrelationships between the identified system elements, to identify system-related candidate properties of the system elements, and to populate a system element template for each identified system element with the system-related candidate properties for that element; and a graphical user interface to be displayed on a display device, the graphical user interface being configured to display the system-related candidate properties for each system element in a data flow diagram region, and configured to receive a system property adoption user input for each system-related candidate property of each identified system element, wherein the data flow diagram editor is configured to generate a data flow diagram for the target computer system comprising each identified system element having the system-related candidate properties adopted according to the system property adoption user input, and is configured to display the generated data flow diagram in the graphical user interface via the display device.

Clause 22. The cybersecurity computing system of clause 21, wherein the system property adoption user input comprises an indication of whether to accept or reject each of the system-related candidate properties.

Clause 23. The cybersecurity computing system of clauses 21 or 22, wherein the system property adoption user input further comprises a modification to at least one system-related candidate property and an acceptance of the modification.

Clause 24. The cybersecurity computing system of any of clauses 21 to 23, wherein the text miner comprises one or more neural networks.

Clause 25. The cybersecurity computing system of any of clauses 21 to 24, wherein the one or more neural networks having been trained using feedback training based on the system property adoption user input.

Clause 26. The cybersecurity computing system of any of clauses 21 to 25, wherein the artificial intelligence model is a first artificial intelligence model, and the text miner is a first text miner, the one or more features are one or more first features, and the unstructured data is first unstructured data, and wherein the executable instructions cause the processor to further implement: a second artificial intelligence model comprising: a second text miner configured to mine second unstructured text sources and extract one or more second features of at least one cybersecurity threat, and a threat template editor configured to process the one or more second features, identify cybersecurity threats associated with the extracted features and their interrelationships with the system elements, and populate a threat template for each identified cybersecurity threat with threat-specific candidate properties for that threat; and wherein the graphical user interface is further configured to display the threat-specific candidate properties in a threat template editor region, and receive a threat property adoption user input for each of the threat-specific candidate properties for each identified cybersecurity threat, wherein the threat template editor is configured to generate a set of cybersecurity threat characteristics comprising a list of cybersecurity threats and the cybersecurity threat characteristics for each of the cybersecurity threats based on the threat property adoption user input, and is configured to display the list of cybersecurity threats and the cybersecurity threat characteristics in the graphical user interface.

Clause 27. The cybersecurity computing system of any of clauses 21 to 26, wherein the threat property adoption user input comprises an indication of whether to accept or reject each of the threat-specific candidate properties.

Clause 28. The cybersecurity computing system of any of clauses 21 to 27, wherein the threat property adoption user input further comprises a modification to at least one of the threat-specific candidate properties and an acceptance of the modification.

Clause 29. The cybersecurity computing system of any of clauses 21 to 28, wherein the second text miner comprises one or more neural networks.

Clause 30. The cybersecurity computing system of any of clauses 21 to 29, wherein the one or more neural networks of the second text miner are trained using feedback training based upon the threat property adoption user input.

Clause 31. A computing method, comprising: at one or more processors of a cybersecurity computing system: mining unstructured data from unstructured text sources to extract features of a target computer system; processing the extracted features to identify system elements of the target computer system and interrelationships between the identified system elements, and to identify candidate system-related candidate properties of the system elements; populating a system element template for each identified system element with the system-related candidate properties for that element; facilitating a display of the system-related candidate properties for each system element in a data flow diagram region; receiving a system property adoption user input for each system-related candidate property of each identified system element; generating data flow diagrams comprising each identified system element having the system-related candidate properties adopted according to the system property adoption user input; and facilitating a presentation of the generated data flow diagrams in a graphical user interface.

Clause 32. The computing method of clause 31, wherein the system property adoption user input comprises an indication of whether to accept or reject each of the system-related candidate properties; and the system property adoption user input further comprises a modification to at least one system-related candidate property and an acceptance of the modification.

Clause 33. The computing method of clauses 31 or 32, wherein mining unstructured text sources comprises processing the unstructured text sources using a text miner that comprises one or more neural networks, the method further comprising: performing feedback training of the one or more neural networks based upon the system property adoption user input.

Clause 34. The computing method of any of clauses 31 to 33, wherein the unstructured data is first unstructured data, and the method further comprises: mining second unstructured text sources to extract features of one or more cybersecurity threats; processing the extracted features to identify cybersecurity threats associated with the extracted features and interrelationships between the cybersecurity threats and the system elements; populating a threat template for each identified cybersecurity threat with threat-specific candidate properties for that threat; facilitating a display of the threat-specific candidate properties in a threat template editor region of the graphical user interface; receiving a threat property adoption user input for each of the threat-specific candidate properties for each identified cybersecurity threat; generating a set of cybersecurity threat characteristics comprising a list of cybersecurity threats and the cybersecurity threat characteristics for each of the cybersecurity threats based on the threat property adoption user input; and facilitating a display of the list of cybersecurity threats having the cybersecurity threat characteristics in the graphical user interface.

Clause 35. The computing method of any of clauses 31 to 34, wherein the threat property adoption user input comprises an indication of whether to accept or reject each of the threat-specific candidate properties.

Clause 36. The computing method of any of clauses 31 to 35, wherein mining the second unstructured text sources comprises processing the second unstructured text sources using a second text miner that comprises one or more neural networks, the method further comprising: performing feedback training of the one or more neural networks of the second text miner based upon the threat property adoption user input.

Clause 37. The computing method of any of clauses 31 to 36, wherein the target computer system is an on-board computing system deployed on an aircraft, an aircraft informatics computing system deployed at a base station and configured to communicate with an aircraft on-board computing system, or an aircraft manufacturing computing system utilized in manufacturing of the aircraft or aircraft components.

Clause 38. A computing method, comprising: at one or more processors of a cybersecurity computing system: mining unstructured text sources to extract features of one or more cybersecurity threats; processing the extracted features to identify cybersecurity threats associated with the extracted features and interrelationships between the cybersecurity threats and system elements of a target computer system; populating a threat template for each identified cybersecurity threat with threat-specific candidate properties for that threat; displaying the threat-specific candidate properties in a threat template editor region of a graphical user interface; receiving a threat property adoption user input for each of the threat-specific candidate properties for each identified cybersecurity threat; generating a set of cybersecurity threat characteristics comprising a list of cybersecurity threats and the cybersecurity threat characteristics for each of the cybersecurity threats based on the threat property adoption user input; and displaying the list of cybersecurity threats having the cybersecurity threat characteristics in the graphical user interface.

Clause 39. The computing method of clause 38, wherein the threat property adoption user input comprises an indication of whether to accept or reject each of the threat-specific candidate properties.

Clause 40. The computing method of clauses 38 or 39, wherein mining the unstructured text sources comprises processing the unstructured text sources using one or more neural networks, the method further comprising: performing feedback training of the one or more neural networks based upon the threat property adoption user input.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

What is claimed is:

1. A cybersecurity computing system, comprising:
   a processor and a memory storing executable instructions that, in response to execution by the processor, cause the processor to implement at least:
   an artificial intelligence model comprising:
      a text miner configured to mine unstructured data from unstructured text sources and extract one or more features of a target computer system, and
      a data flow diagram editor configured to process the one or more features to identify system elements of the target computer system and interrelationships between the identified system elements, to identify system-related candidate properties of the system elements, and to populate a system element template for each identified system element with the system-related candidate properties for that element; and
   a graphical user interface to be displayed on a display device, the graphical user interface being configured to display the system-related candidate properties for each system element in a data flow diagram region, and configured to receive a system property adoption user input for each system-related candidate property of each identified system element, wherein
   the data flow diagram editor is configured to generate a data flow diagram for the target computer system comprising each identified system element having the system-related candidate properties adopted according to the system property adoption user input, and is configured to display the generated data flow diagram in the graphical user interface via the display device.

2. The cybersecurity computing system of claim 1, wherein the system property adoption user input comprises an indication of whether to accept or reject each of the system-related candidate properties.

3. The cybersecurity computing system of claim 2, wherein the system property adoption user input further comprises a modification to at least one system-related candidate property and an acceptance of the modification.

4. The cybersecurity computing system of claim 1, wherein the text miner comprises one or more neural networks.

5. The cybersecurity computing system of claim 4, wherein the one or more neural networks have been trained using feedback training based on the system property adoption user input.

6. The cybersecurity computing system of claim 1, wherein the artificial intelligence model is a first artificial intelligence model, and the text miner is a first text miner, the one or more features are one or more first features, and the unstructured data is first unstructured data, and wherein the executable instructions cause the processor to further implement:
   a second artificial intelligence model comprising:
      a second text miner configured to mine second unstructured text sources and extract one or more second features of at least one cybersecurity threat, and
      a threat template editor configured to process the one or more second features, identify cybersecurity threats associated with the one or more second features and their interrelationships with the system elements, and populate a threat template for each identified cybersecurity threat with threat-specific candidate properties for that threat; and wherein the graphical user interface is further configured to display the threat-specific candidate properties in a threat template editor region, and receive a threat property adoption user input for each of the threat-specific candidate properties for each identified cybersecurity threat, wherein the threat template editor is configured to generate a set of cybersecurity threat characteristics comprising a list of cybersecurity threats and the cybersecurity threat characteristics for each of the cybersecurity threats based on the threat property adoption user input, and is configured to display the list of cybersecurity threats and the cybersecurity threat characteristics in the graphical user interface.

7. The cybersecurity computing system of claim 6, wherein the threat property adoption user input comprises an indication of whether to accept or reject each of the threat-specific candidate properties.

8. The cybersecurity computing system of claim 7, wherein the threat property adoption user input further comprises a modification to at least one of the threat-specific candidate properties and an acceptance of the modification.

9. The cybersecurity computing system of claim 6, wherein the second text miner comprises one or more neural networks.

10. The cybersecurity computing system of claim 9, wherein the one or more neural networks of the second text miner are trained using feedback training based upon the threat property adoption user input.

11. A computing method, comprising:
at one or more processors of a cybersecurity computing system:
mining unstructured data from unstructured text sources to extract features of a target computer system;
processing the extracted features to identify system elements of the target computer system and interrelationships between the identified system elements, and to identify candidate system-related candidate properties of the system elements;
populating a system element template for each identified system element with the system-related candidate properties for that element;
facilitating a display of the system-related candidate properties for each system element in a data flow diagram region;
receiving a system property adoption user input for each system-related candidate property of each identified system element;
generating data flow diagrams comprising each identified system element having the system-related candidate properties adopted according to the system property adoption user input; and
facilitating a presentation of the generated data flow diagrams in a graphical user interface.

12. The computing method of claim 11, wherein
the system property adoption user input comprises an indication of whether to accept or reject each of the system-related candidate properties; and
the system property adoption user input further comprises a modification to at least one system-related candidate property and an acceptance of the modification.

13. The computing method of claim 11, wherein mining unstructured text sources comprises processing the unstructured text sources using a text miner that comprises one or more neural networks, the method further comprising:
performing feedback training of the one or more neural networks based upon the system property adoption user input.

14. The computing method of claim 11, wherein the unstructured data is first unstructured data, and the method further comprises:
mining second unstructured text sources to extract features of one or more cybersecurity threats;
processing the extracted features to identify cybersecurity threats associated with the extracted features and interrelationships between the cybersecurity threats and the system elements;
populating a threat template for each identified cybersecurity threat with threat-specific candidate properties for that threat;
facilitating a display of the threat-specific candidate properties in a threat template editor region of the graphical user interface;
receiving a threat property adoption user input for each of the threat-specific candidate properties for each identified cybersecurity threat;
generating a set of cybersecurity threat characteristics comprising a list of cybersecurity threats and the cybersecurity threat characteristics for each of the cybersecurity threats based on the threat property adoption user input; and
facilitating a display of the list of cybersecurity threats having the cybersecurity threat characteristics in the graphical user interface.

15. The computing method of claim 14, wherein the threat property adoption user input comprises an indication of whether to accept or reject each of the threat-specific candidate properties.

16. The computing method of claim 14, wherein mining the second unstructured text sources comprises processing the second unstructured text sources using a second text miner that comprises one or more neural networks, the method further comprising:
performing feedback training of the one or more neural networks of the second text miner based upon the threat property adoption user input.

17. The computing method of claim 14, wherein the target computer system is an on-board computing system deployed on an aircraft, an aircraft informatics computing system deployed at a base station and configured to communicate with an aircraft on-board computing system, or an aircraft manufacturing computing system utilized in manufacturing of the aircraft or aircraft components.

18. A computing method, comprising:
at one or more processors of a cybersecurity computing system:
mining unstructured text sources to extract features of one or more cybersecurity threats;
processing the extracted features to identify cybersecurity threats associated with the extracted features and interrelationships between the cybersecurity threats and system elements of a target computer system;
populating a threat template for each identified cybersecurity threat with threat-specific candidate properties for that threat;

displaying the threat-specific candidate properties in a threat template editor region of a graphical user interface;

receiving a threat property adoption user input for each of the threat-specific candidate properties for each identified cybersecurity threat;

generating a set of cybersecurity threat characteristics comprising a list of cybersecurity threats and the cybersecurity threat characteristics for each of the cybersecurity threats based on the threat property adoption user input; and displaying the list of cybersecurity threats having the cybersecurity threat characteristics in the graphical user interface.

19. The computing method of claim 18, wherein the threat property adoption user input comprises an indication of whether to accept or reject each of the threat-specific candidate properties.

20. The computing method of claim 18, wherein mining the unstructured text sources comprises processing the unstructured text sources using one or more neural networks, the method further comprising:

performing feedback training of the one or more neural networks based upon the threat property adoption user input.

\* \* \* \* \*